United States Patent
Park et al.

(10) Patent No.: US 12,066,696 B2
(45) Date of Patent: Aug. 20, 2024

(54) META-OPTICAL DEVICE AND ELECTRONIC APPARATUS INCLUDING THE SAME

(71) Applicant: SAMSUNG ELECTRONICS CO., LTD., Suwon-si (KR)

(72) Inventors: Hyeonsoo Park, Seoul (KR); Hyunsung Park, Suwon-si (KR); Seunghoon Han, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 566 days.

(21) Appl. No.: 17/400,840

(22) Filed: Aug. 12, 2021

(65) Prior Publication Data
US 2022/0221741 A1    Jul. 14, 2022

(30) Foreign Application Priority Data

Jan. 12, 2021    (KR) .................. 10-2021-0004239

(51) Int. Cl.
  *G02F 1/01*    (2006.01)
  *G02B 1/00*    (2006.01)
  *G02F 1/00*    (2006.01)

(52) U.S. Cl.
  CPC .......... *G02F 1/0121* (2013.01); *G02B 1/002* (2013.01); *G02F 1/0018* (2013.01)

(58) Field of Classification Search
  CPC .... G02B 1/002; G02B 5/1809; G02B 5/1871; G02B 2207/101; G02B 5/1876;
  (Continued)

(56) References Cited

U.S. PATENT DOCUMENTS 9,103,973 B2    8/2015   Fattal et al.
10,365,535 B2   7/2019   Ahmed et al.
(Continued)

FOREIGN PATENT DOCUMENTS

CN    109683310 A    4/2019
CN    111158070 A    5/2020
(Continued)

OTHER PUBLICATIONS

Avayu, O., et al., "Composite functional metasurfaces for multispectral achromatic optics", Nature Communications, Apr. 5, 2017, pp. 1-7.
(Continued)

*Primary Examiner* — Christopher Stanford
*Assistant Examiner* — Journey F Sumlar
(74) *Attorney, Agent, or Firm* — Sughrue Mion, PLLC

(57) ABSTRACT

Provided is a meta-optical device exhibiting a target phase delay profile with respect to incident light of a predetermined wavelength band, the meta-optical device including: a first layer including a plurality of first nanostructures and a first surrounding material surrounding the plurality of first nanostructures, and having a first phase delay profile of a first tendency that is substantially equal to a tendency of the target phase delay profile; a second layer including a plurality of second nanostructures and a second surrounding material surrounding the plurality of second nanostructures, and having a second phase delay profile of a second tendency that is substantially opposite to the tendency of the target phase delay profile; and a third layer including a plurality of third nanostructures and a third surrounding material surrounding the plurality of third nanostructures, wherein the third layer is different from the second layer in terms of at least one of a material and an arrangement rule. The meta-optical device is capable of minimizing a primary dispersion and higher-order dispersions and thus may
(Continued)

exhibit constant diffraction efficiency with respect to light of a wide wavelength band.

28 Claims, 17 Drawing Sheets

(58) Field of Classification Search
CPC .. G02B 27/4272; G02B 5/189; G02B 5/1842; G02B 2005/1804; G01B 11/24; B82Y 20/00

See application file for complete search history.

(56) References Cited

U.S. PATENT DOCUMENTS

| | | | |
|---|---|---|---|
| 2013/0162375 A1 | 6/2013 | Kitaoka et al. | |
| 2014/0044392 A1 | 2/2014 | Fattal et al. | |
| 2016/0316180 A1* | 10/2016 | Han | G02B 13/0055 |
| 2018/0196138 A1* | 7/2018 | Lee | G02F 1/21 |
| 2018/0224574 A1* | 8/2018 | Lee | G02B 1/002 |
| 2019/0025464 A1 | 1/2019 | Czaplewski et al. | |
| 2019/0033683 A1 | 1/2019 | Ahmed et al. | |
| 2019/0086579 A1* | 3/2019 | Kim | G02B 27/4211 |
| 2020/0096672 A1 | 3/2020 | Yu et al. | |
| 2021/0271000 A1 | 9/2021 | Park et al. | |

FOREIGN PATENT DOCUMENTS

| | | |
|---|---|---|
| JP | 5957877 B2 | 7/2016 |
| KR | 1020200071586 A | 6/2020 |
| WO | 2018218063 A1 | 11/2018 |
| WO | 2020068844 A1 | 4/2020 |

OTHER PUBLICATIONS

Pors, A., et al., "Broadband Focusing Flat Mirrors Based on Plasmonic Gradient Metasurfaces" NANO Letters, vol. 13, 2013, pp. 829-834.

Shrestha, Sajan et al., "Multi-Element Meta-lens Systems for Imaging", 2019 Conference on Lasers and Electro-Optics (CLEO), OSA, May 5, 2019, pp. 1-2, XP033570586.

Communication issued Feb. 17, 2022 by the European Patent Office in counterpart European Patent Application No. 21193459.1.

* cited by examiner

META-OPTICAL DEVICE AND ELECTRONIC APPARATUS INCLUDING THE SAME

CROSS-REFERENCE TO RELATED APPLICATION(S)

This application is based on and claims priority under 35 U.S.C. § 119 to Korean Patent Application No. 10-2021-0004239, filed on Jan. 12, 2021, in the Korean Intellectual Property Office, the disclosure of which is incorporated by reference herein in its entirety.

BACKGROUND

1. Field

Embodiments set forth herein relate to a meta-optical device and an electronic device including the same.

2. Description of Related Art

A flat diffractive element using a meta-structure may exhibit a variety of optical effects that cannot be achieved by using existing refractive elements, and thus, a thin optical system may be implemented. Accordingly, the meta-structure has drawn much attention for use in many areas.

The meta-structure includes a nanostructure that has a shape, period, or the like, less than a wavelength of incident light. To obtain a desired optical performance, the nanostructure is designed to satisfy a phase delay profile set at each location with respect to light of a desired wavelength band. When designing the nanostructure, it is difficult to obtain a constant diffraction efficiency at the desired wavelength band. For example, the wider the desired wavelength band, the greater the difference in the diffraction efficiency between a central region and a peripheral region.

SUMMARY

Provided is a meta-optical device capable of operating at a broadband wavelength and exhibiting high efficiency.

Provided is an electronic device using the meta-optical device.

Additional aspects will be set forth in part in the description which follows and, in part, will be apparent from the description, or may be learned by practice of the presented embodiments.

According to an aspect of an example embodiment, a meta-optical device which exhibits a target phase delay profile with respect to incident light in a predetermined wavelength band may include a first layer including a plurality of first nanostructures and a first surrounding material surrounding the plurality of first nanostructures, the first layer having a first phase delay profile of a first tendency that is substantially equal to a tendency of the target phase delay profile; a second layer provided adjacent to the first layer and including a plurality of second nanostructures and a second surrounding material surrounding the plurality of second nanostructures, the second layer having a second phase delay profile of a second tendency that is substantially opposite to the tendency of the target phase delay profile; and a third layer provided adjacent to the second layer and including a plurality of third nanostructures and a third surrounding material surrounding the plurality of third nanostructures, the third layer having a third phase delay profile different from the second phase delay profile, wherein the third layer includes a third material that is different than a second material of the second layer, or includes a third arrangement rule that is different than a second arrangement rule of the second layer.

The predetermined wavelength band may include a visible-light band or a near-infrared band.

The predetermined wavelength band may have a bandwidth greater than or equal to substantially 300 nanometers.

A minimum diffraction efficiency in the predetermined wavelength band may be greater than or equal to substantially 90%.

A ratio $\Delta\lambda/\lambda_0$ of a bandwidth $\Delta\lambda$ to a center wavelength $\lambda_0$ of the predetermined wavelength band is greater than or equal to substantially 15%.

The plurality of first nanostructures, the plurality of second nanostructures, and the plurality of third nanostructures may each have shape dimensions less than a center wavelength of the predetermined wavelength band.

A height of the plurality of first nanostructures with respect to a center wavelength $\lambda_0$ of the predetermined wavelength band may be in a range of substantially $2\lambda_0$ to $5\lambda_0$.

A ratio of the height of the plurality of first nanostructures to a width of the plurality of first nanostructures may be greater than substantially 2.

The respective heights of the plurality of second nanostructures and the plurality of third nanostructures with respect to a center wavelength $\lambda_0$ of the predetermined wavelength band may be in a range of substantially $0.5\lambda_0$ to $2\lambda_0$.

The first layer may include a plurality of phase modulation regions in which a certain range of phase modulation is repeatedly performed, and wherein a section of the first layer adjacent to a boundary between the plurality of phase modulation regions is not provided with the plurality of first nanostructures.

A ratio of a width of the section to a width of a corresponding phase modulation region may be greater than or equal to substantially 5%.

The third material of the third layer may have a lower refractive index and a lower dispersion than the second material of the second layer.

The plurality of first nanostructures may have a lower refractive index than a refractive index of the first surrounding material, the plurality of second nanostructures has a higher refractive index than a refractive index of the second surrounding material, and the plurality of first nanostructures and the plurality of second nanostructures each have a substantially similar tendency of change of a width in a direction away from a center of the meta-optical device.

The plurality of third nanostructures has a refractive index greater than a refractive index of the third surrounding material and less than the refractive index of the plurality of second nanostructures.

The meta-optical device may include a substrate having a refractive index less than or equal to the refractive index of the third surrounding material, and the third layer, the second layer, and the first layer may be sequentially arranged on the substrate.

The meta-optical device may include a substrate having a refractive index less than or equal to the refractive index of the third surrounding material, and the third layer, the first layer, and the second layer are sequentially arranged on the substrate.

The plurality of first nanostructures may have a refractive index less than the refractive index of the first surrounding material, the plurality of second nanostructures may have a refractive index less than the refractive index of the second surrounding material, and the plurality of first nanostructures and the plurality of second nanostructures may have substantially opposite tendencies of change of a width in a direction away from a center of the meta-optical device.

The plurality of third nanostructures may have a refractive index greater than a refractive index of the third surrounding material and less than a refractive index of the second surrounding material.

The meta-optical device may include a substrate having a refractive index less than or equal to a refractive index of the third surrounding material, and the third layer, the second layer, and the first layer may be sequentially arranged on the substrate.

The first nanostructure may have a refractive index greater than a refractive index of the first surrounding material, the second nanostructure may have a refractive index greater than a refractive index of the second surrounding material, and the plurality of first nanostructures and the plurality of second nanostructures may have substantially opposite tendencies of change of a width in the direction away from the center of the meta-optical device.

The plurality of third nanostructures may have a refractive index greater than a refractive index of the third surrounding material and less than the refractive index of the plurality of second nanostructures.

The plurality of third nanostructures may have a refractive index less than a refractive index of the third surrounding material and the refractive index of the second nanostructure.

The plurality of first nanostructures, the plurality of second nanostructures, and the plurality of third nanostructures may each have a cylindrical shape, a polyprism shape, a truncated cone shape, or a truncated polygonal shape.

A cross section of each of the plurality of first nanostructures, the plurality of second nanostructures, and the plurality of third nanostructures perpendicular to respective heights of the plurality of first nanostructures, the plurality of second nanostructures, and the plurality of third nanostructures may have a circular shape, a polygonal shape, a circular ring shape, or a polygonal ring shape.

A refractive index difference at each of the first layer, the second layer, and the third layer may be greater than or equal to substantially 0.2.

According to an aspect of an example embodiment, an electronic device may include a meta-optical device which exhibits a target phase delay profile with respect to incident light in a predetermined wavelength band, the meta-optical device including a first layer including a plurality of first nanostructures and a first surrounding material surrounding the plurality of first nanostructures, the first layer having a first phase delay profile of a first tendency that is substantially equal to a tendency of the target phase delay profile; a second layer provided adjacent to the first layer and including a plurality of second nanostructures and a second surrounding material surrounding the plurality of second nanostructures, the second layer having a second phase delay profile of a second tendency that is substantially opposite to the tendency of the target phase delay profile; and a third layer provided adjacent to the second layer and including a plurality of third nanostructures and a third surrounding material surrounding the plurality of third nanostructures, the third layer having a third phase delay profile different from the second phase delay profile, wherein the third layer includes a third material that is different than a second material of the second layer, or includes a third arrangement rule that is different than a second arrangement rule of the second layer.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
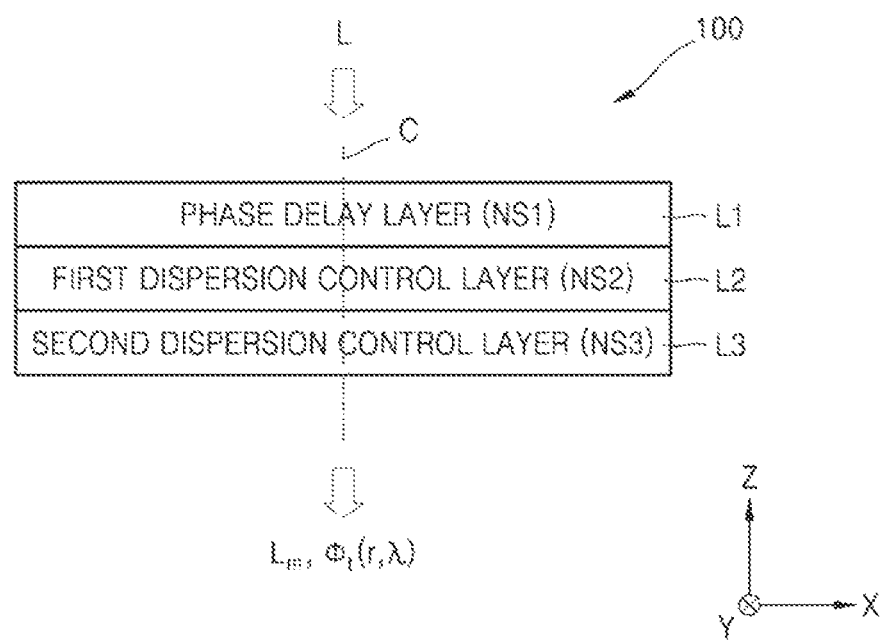
FIG. 1 is a conceptual diagram schematically illustrating a configuration and function of a meta-optical device according to example embodiments.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments will be described in detail with reference to the accompanying drawings. Embodiments described below are merely examples and various modifications may be made therein. In the drawings, the same reference numerals represent the same elements, and a size of each element may be exaggerated for clarity and convenience of description.

It will be understood that when one element is referred to as being "on" or "above" another element, the element may be on the other element in direct contact with the other element or without contacting the other element.

The terms "first," "second," etc., may be used to describe various elements but are only used herein to distinguish one element from another element. These terms are not intended to limit materials or structures of elements.

As used herein, the singular expressions of terms are intended to include plural forms of the terms as well, unless the context clearly dictates otherwise. It will be understood that when an element is referred to as "including" another element, the element may further include other elements unless mentioned otherwise.

Terms such as "unit," "module," and the like, when used herein, represent units for processing at least one function or operation, which may be implemented by hardware, software, or a combination of hardware and software.

The term "the" and demonstratives similar thereto may be understood to include both singular and plural forms.

Terms such as "substantially," "about," or the like, as used herein are intended to include a variation of ±10%, ±9%, ±8%, ±7%, ±6%, ±5%, ±4%, ±3%, ±2%, or ±1% of the recited numerical value.

Unless explicitly stated that operations of a method should be performed in an order described below, the operations may be performed in an appropriate order. In addition, all terms indicating examples (e.g., "etc.") are only for the purpose of describing technical ideas in detail, and thus the scope of the present disclosure is not limited by these terms unless limited by the claims.

Figure 2:
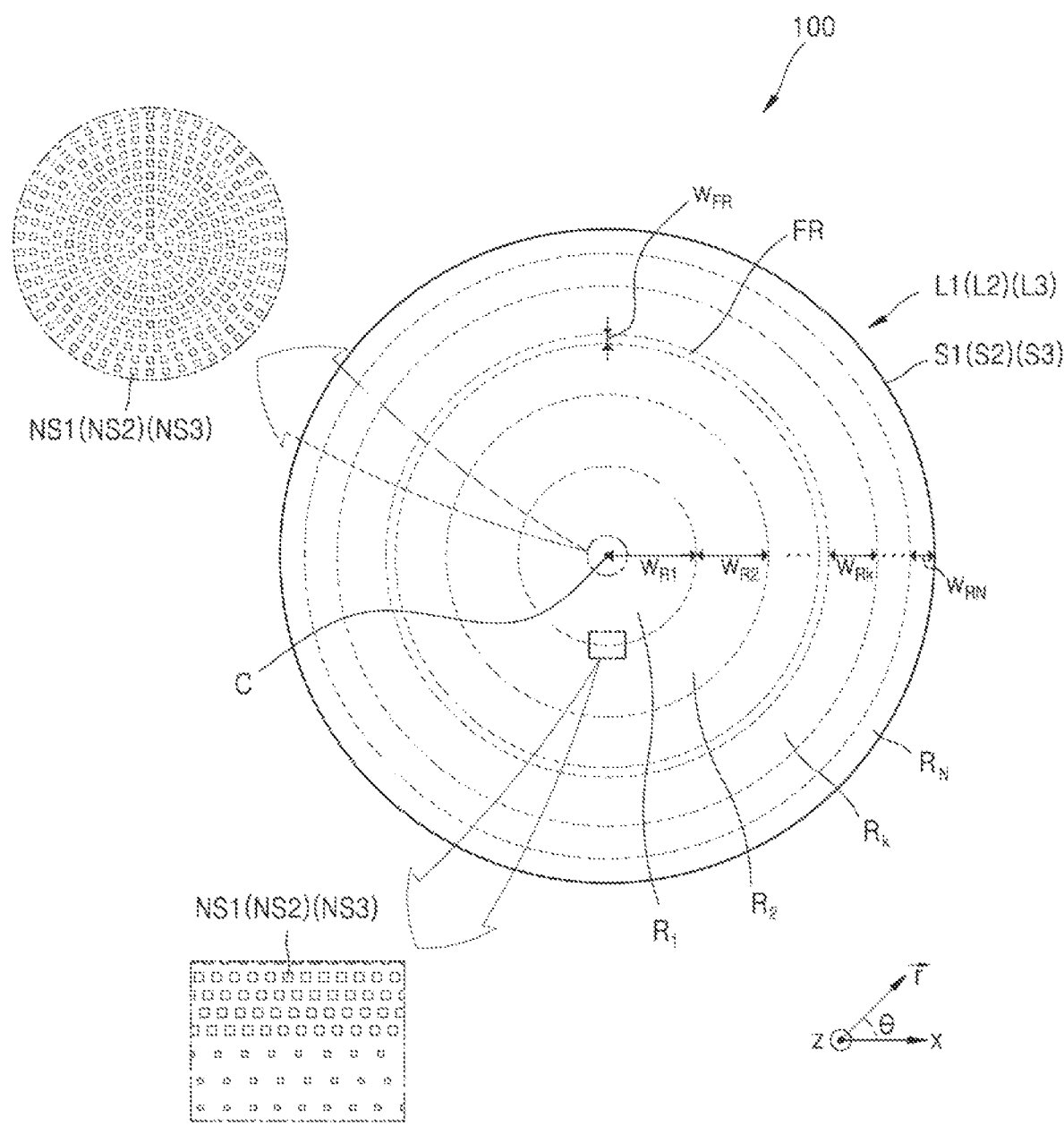
FIG. 2 is a plan view of the meta-optical device of FIG. 1.

FIG. 1 is a conceptual diagram schematically illustrating a configuration and function of a meta-optical device according to example embodiments. FIG. 2 is a plan view of the meta-optical device of FIG. 1.

A meta-optical device 100 is a diffractive device using a nanostructure having a sub-wavelength shape dimension, and a particular structure thereof is set to represent a certain target phase delay profile with respect to incident light of a predetermined wavelength band. That is, the target phase delay profile is a phase profile that can be obtained (measured or computer simulated) using the meta-optical device 100 with light of the predetermined wavelength band. Here, the term "sub-wavelength" refers to a value smaller than a center wavelength $\lambda_0$ of the wavelength band.

Incident light L, when passing through the meta-optical device 100, is output as modulated light $L_m$, the phase of which is modulated according to location. When light is incident on and passes through the meta-optical device 100, a refractive index distribution occurs due to an arrangement of a plurality of nanostructures NS1, NS2, and NS3 having different refractive indexes from that of a surrounding material. A form of a wavefront connecting points of the same phase in a propagation path of light is different before and after the occurrence of the refractive index distribution due to the arrangement of the plurality of nanostructures NS1, NS2, and NS3, and this difference is referred to as a phase delay. A degree of the phase delay varies according to a position, which is a variable of the refractive index distribution. The degree of the phase delay varies according to x and y coordinates on a plane perpendicular to a propagation direction (a Z-axis direction) of light at a position of incident light L, which is incident in the Z-axis direction, immediately after passing through the meta-optical device 100. As described above, a phase of light passing through the meta-optical device 100 is different from that of the light when incident on the meta-optical device 100. A target phase delay profile $\varphi_t$ represented by the modulated light $L_m$ represents a phase relative to the phase of the incident light L. The target phase delay profile $\varphi_t$ represents a phase delay at each position after the incident light L passes through the meta-optical device 100, and the phase delay depends on a wavelength $\lambda$ of the incident light L. The target phase delay profile $\varphi_t$ is therefore represented by a function $(\varphi_t(r, \lambda))$ of a position and a wavelength.

The optical performance of the meta-optical device 100, e.g., functions of a lens, a mirror, a beam deflector, a beam shaper, or the like, may be determined by the target phase delay profile $\varphi_t$.

The meta-optical device 100 includes a first layer L1, a second layer L2, and a third layer L3. The first layer L1 has a first nanostructure NS1-based structure and serves as a phase delay layer, and the second layer L2 and the third layer L3 respectively have a second nanostructure NS2-based structure and a third nanostructure NS3-based structure and serve as a dispersion control layer.

A material and shape distribution of first nanostructures NS1 may be set such that the first layer L1 serving as the phase delay layer represents a first phase delay profile of a tendency that is substantially equal to a tendency of the target phase delay profile $\varphi_t$, i.e., the first nanostructures NS1 exhibit a change $\partial n/\partial r$ of an effective refractive index according to a position r for implementing the target phase delay profile $\varphi_t$.

The second layer L2 serving as a first dispersion control layer and the third layer L3 serving as a second dispersion control layer are provided to offset a dispersion occurring at the first layer L1. The dispersion is related to a material chromatic dispersion $\partial N/\partial \lambda$ according to which a refractive index of a material varies according to a wavelength. When the dispersion is high, a phase modulation difference increases according to a wavelength and thus desired optical performance may vary according to a wavelength. Generally, such a dispersion includes a primary dispersion as a major component but also includes a higher-order component $((\partial/\partial\lambda)^k n)$. In an embodiment, in the meta-optical device 100, the second layer L2 is set to mainly offset the primary dispersion and the third layer L3 is set to mainly offset higher-order dispersions such as a second-order or higher dispersion.

A material, shape, and arrangement of second nanostructures NS2 may be set such that the second layer L2 represents a phase delay profile of a different tendency from the target phase delay profile $\varphi_t$ and has a main function of controlling a refractive index dispersion according to a wavelength. The second layer L2 may represent a second phase delay profile of a tendency substantially opposite to that of the target phase delay profile $\varphi_t$ to offset a dispersion occurring at the first layer L1. That is, the first layer L1 and the second layer L2 may be substantially opposite in terms of a sign of a change rate of an effective refractive index according to position. For example, when a material and shape of first nanostructures NS1 of the first layer L1 are set such that an effective refractive index gradually increases in a first direction, a material and shape of second nanostructures NS2 of the second layer L2 may be set such that an effective refractive index gradually decreases in the first direction. Conversely, when the material and shape of the first nanostructures NS1 of the first layer L1 are set such that an effective refractive index gradually decreases in the first direction, the material and shape of the second nanostructures NS2 of the second layer L2 may be set such that an effective refractive index gradually increases in the first direction. Further, the second layer L2 may employ a material or structure with a high dispersion so that a change rate of a dispersion according to a location is greater than that of the first layer L1.

The third layer L3 is provided to reduce higher-order dispersions. The third layer L3 may represent a phase delay different from the first phase delay profile and the second phase delay profile. A material and shape distribution of the third nanostructure NS3 are set by modifying at least one of the material of and an arrangement rule applied to the second layer L2. The third layer L3 may include a material having a lower refractive index and a lower dispersion than those of the second layer L2. That is, a material having a higher dispersion than that of the first layer L1 and a lower dispersion than that of the second layer L2 may be employed as a material of the third layer L3.

In the above description, the phase delay profile of the first layer L1 indicates a phase distribution at a location of the light immediately passing through the first nanostructures NS1 of the first layer L1 relative to a phase of light incident on the first nanostructures NS1. The phase delay profile of the second layer L2 indicates a phase distribution at a location of the light immediately after passing through the second nanostructures NS2 of the second layer L2 relative to a phase of light incident on the second nanostructure NS2. The phase delay profile of the third layer L3 indicates a phase distribution at a location of the light immediately after passing through the third nanostructures NS3 of the third layer L3 relative to a phase of light incident on the third nanostructure NS3.

The three-layer structure achieves constant efficiency at a desired wavelength band while implementing the desired target phase delay profile $\varphi_t$ of the meta-optical device 100. That is, the three-layer structure is increases efficiency of a desired optical function at not only a central region of the wavelength band but also a peripheral region. The wavelength band may include a visible-light band or a near-infrared band and a bandwidth thereof may be about 300 nm or more. Minimum diffraction efficiency of the meta optical device 100 at the wavelength band may be 90% or more. Diffraction efficiency refers to a ratio of the energy of light diffracted in a desired direction to the energy of light transmitted through the meta-optical device 100. A ratio $\Delta\lambda/\lambda_0$ of a bandwidth $\Delta\lambda$ to a central wavelength $\lambda_0$ of the wavelength band may be 15% or more. The ratio $\Delta\lambda/\lambda_0$ may be 40% or more.

In an embodiment, the meta-optical device 100 includes the first layer L1, which is a phase delay layer exhibiting a phase delay profile of a tendency that is substantially equal to a tendency of the target phase delay profile $\varphi_t$, and the second layer L2 and the third layer L3, which are two dispersion control layers exhibiting a phase delay profile of a different tendency from the target phase delay profile $\varphi_t$ and configured to control a dispersion of the phase delay layer, thereby promoting constant efficiency in a wide wavelength band.

The positions of the first layer L1, the second layer L2, and the third layer L3 may be switched from one another. Although FIG. 1 illustrates that the incident light L sequentially passes through the first layer L1, the second layer L2, and the third layer L3, embodiments are not limited thereto. For example, an order of these layers may be set to achieve a change of an effective refractive index as small as possible at a boundary of each of the layers.

The shapes of the first nanostructure NS1, the second nanostructure NS2, and the third nanostructure NS3 of each layer may be determined by a function of positions of the first nanostructures NS1, the second nanostructures NS2, and the third nanostructures NS3. For example, the first nanostructure NS1 of the first layer L1 may be determined by a function of coordinates (x, y) on a plane S1 on which the first nanostructures NS1 are placed. The coordinates (x, y) may be determined by a distance from a point on the plane S1 that meets a central axis C of the meta-optical device 100 and a function of an angle $\theta$ between a radius vector of a corresponding position and an x-axis. The second nanostructure NS2 of the second layer L2 may be determined by a function of coordinates (x, y) on a plane S2 on which the second nanostructures NS2 are placed. The coordinates (x, y) may be determined by a distance from a point on the plane S2 that meets the central axis C of the meta-optical device 100 and a function of an angle $\theta$ between a radius vector of a corresponding position and the x-axis. The third nanostructure NS3 of the third layer L3 may be determined by a function of coordinates (x, y) on a plane S3 on which the third nanostructures NS3 are placed. The coordinates (x, y) may be determined by a distance from a point on the plane S3 that meets the central axis C of the meta-optical device 100 and a function of an angle $\theta$ between a radius vector of a corresponding position and the x-axis. Each of the first nanostructure NS1 of the first layer L1, the second nanostructure NS2 of the second layer L2, and the third nanostructure NS3 of the third layer L3 may be determined by a polar symmetric function that depends only on a distance from a center thereof.

Each of the first nanostructures NS1, the second nanostructures NS2, and the third nanostructures NS3 may be arranged two-dimensionally, based on rectangular coordinates, arranged in a hexagonal lattice form, or arranged two-dimensionally in a radial direction or a circumferential direction with respect to polar coordinates.

In an embodiment, the shapes and arrangements of the first nanostructures NS1, the second nanostructures NS2, and the third nanostructures NS3 may be set to implement a change of an effective refractive index and a phase delay profile in a radial direction away from centers defined on the planes S1, S2, and S3 on which the first nanostructures NS1, the second nanostructures NS2, and the third nanostructures NS3 are placed.

The shapes of the first nanostructures NS1, the second nanostructures NS2, and the third nanostructures NS3 may comply with a certain rule, and each region of the first layer L1, the second layer L2, and the third layer L3 is divided in accordance with the rule. An area of the meta-optical device 100 may be partitioned into a central round region $R_1$ and a plurality of ring-shaped regions $R_2, \ldots, R_N$ surrounding the central round region $R_1$ as illustrated in FIG. 2. The nanostructures NS1, NS2, and NS3 in the same region of each layer may be arranged according to the same rule.

The regions $R_1, \ldots R_k, \ldots R_N$ are phase modulation regions indicating a phase delay that is in a certain range, and a phase modulation range of the second region $R_2$ to the $n^{th}$ region $R_N$ may be the same. The phase modulation range may be $2\pi$ radian. The phase modulation range of the first region $R_1$ may be $2\pi$ radians or less but the first region $R_1$ to the $N^{th}$ region $R_N$ may be generally referred to together as a $2\pi$ zone.

Functions and the total number N or width $W_{R1}, \ldots W_{Rk}, \ldots W_{RN}$ of these regions may be main variables of the performance of the meta-optical device 100. As described above, the first layer L1 of the meta-optical device 100 is a layer in charge of a phase and exhibits a phase profile of the substantially similar tendency as a target phase profile. An optical function of the meta-optical device 100 is set according to the phase profile exhibited by the first layer L1, and the second layer L2 and the third layer L3 mainly contribute to the efficiency of the optical function of the meta-optical device 100.

The first layer L1 may include a section FR adjacent to a boundary between the plurality of phase modulation regions $R_1, \ldots R_k, \ldots R_N$, the section FR not including the first nanostructure NS1. The section FR may be represented as a region with a fill factor of 100%. The section FR may be provided in a part of the plurality of phase modulation regions $R_1, \ldots R_k, \ldots R_N$, and a plurality of sections FR may be provided. A ratio of a width $W_{FR}$ of the section FR to a width $W_{RK}$ of a corresponding phase modulation region may be 5% or more.

A position of the section FR may be a start or end position of the phase modulation region. For example, the position of the section FR may vary according to whether the first nanostructure NS1 of the first layer L1 has a lower refractive index or a higher refractive index than that of a surrounding material. The section FR may be provided to reduce discontinuity of a phase profile that may occur at an end of each phase modulation region, i.e., a part of each phase modulate region adjacent to another phase modulation region.

In order to allow the meta-optical device 100 to function as a lens, in-region rules may be set such that a width of each region is not the same and a direction of diffraction of incident light in each region is slightly different. The number of regions relates to a degree (e.g., absolute value) of refractive power and a sign of the refractive power may be determined according to the in-region rules. For example, positive refractive power may be implemented according to an arrangement rule for decreasing the size of the first nanostructure NS1 in each region in a radial direction, and negative refractive power may be implemented according to an arrangement rule for increasing the size of the first nanostructure NS1 in each region in the radial direction.

In order to allow the meta-optical device 100 to function as a beam deflector, the in-region rules may be set so that the widths $W_{R1}, \ldots W_{Rk}, \ldots W_{RN}$ of the regions $R_1, R_2, \ldots, R_N$ of the first layer L1 may be the same and incident light L in each region may be diffracted in a certain direction.

The meta-optical device 100 may function as a beam shaper having a distribution according to a location, as well as a lens or a beam deflector.

The first nanostructure NS1, the second nanostructure NS2, and the third nanostructure NS3 are each formed of a material having a refractive index different from that of a surrounding material. For example, the material may have a refractive index greater or less by 0.2 or more than that of the surrounding material. A refractive index difference may be about 0.2 or more or about 0.5 or more. Some of the first nanostructure NS1, the second nanostructure NS2, and the third nanostructure NS3 may have a higher refractive index than that of the surrounding material and the other may have a lower refractive index than that of the surrounding material.

When the first nanostructure NS1, the second nanostructure NS2, and the third nanostructure NS3 are formed of a material having a higher refractive index than that of the surrounding material, the first nanostructure NS1, the second nanostructure NS2, and the third nanostructure NS3 may include at least one of c-Si, p-Si, a-Si, or III-V compound semiconductor (GaAs, GaP, GaN, etc.), and the surrounding material having the lower refractive index may include a polymer material such as SU-8 or PMMA, $SiO_2$ or SOG.

When the first nanostructure NS1, the second nanostructure NS2, and the third nanostructure NS3 are formed of a material having a lower refractive index than that of the surrounding material, the first nanostructure NS1, the second nanostructure NS2, and the third nanostructure NS3 may include $SiO_2$ or air, and the surrounding material having the higher refractive index may include at least one of c-Si, p-Si, a-Si, or III-V compound semiconductor (GaAs, GaP, GaN, etc.), or a combinations thereof.

Figure 3:
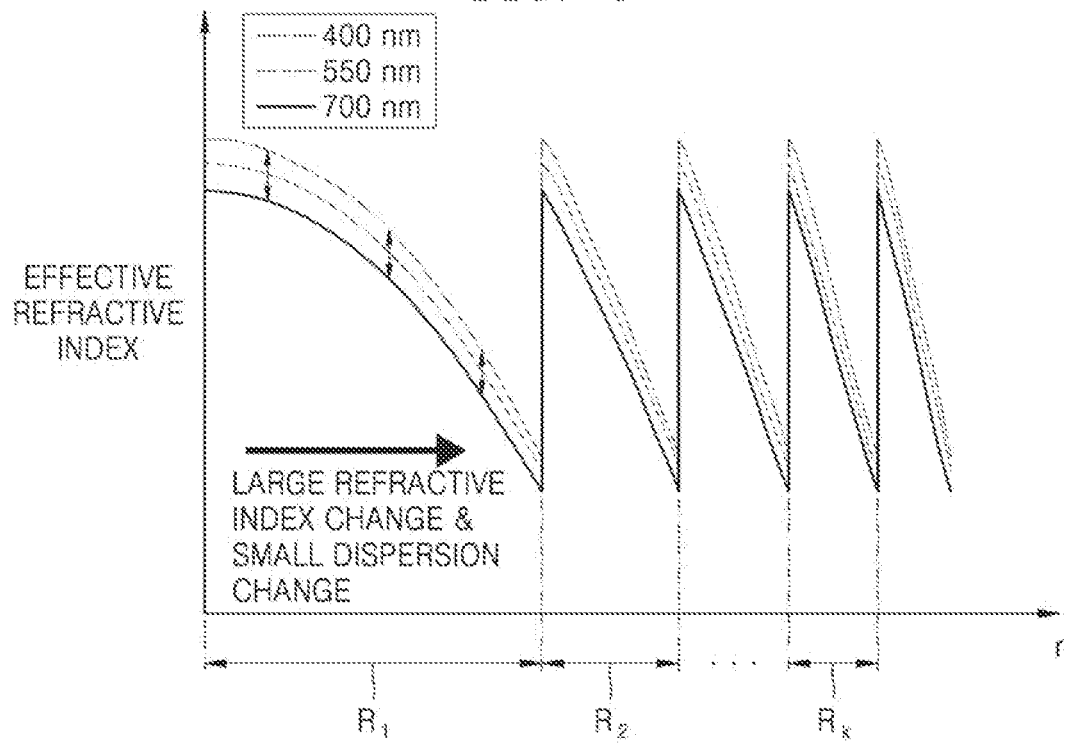
FIG. 3 is a graph showing an effective refractive index and a dispersion of a phase delay layer of the meta-optical device of FIG. 1 according to wavelength and position.
Figure 4:
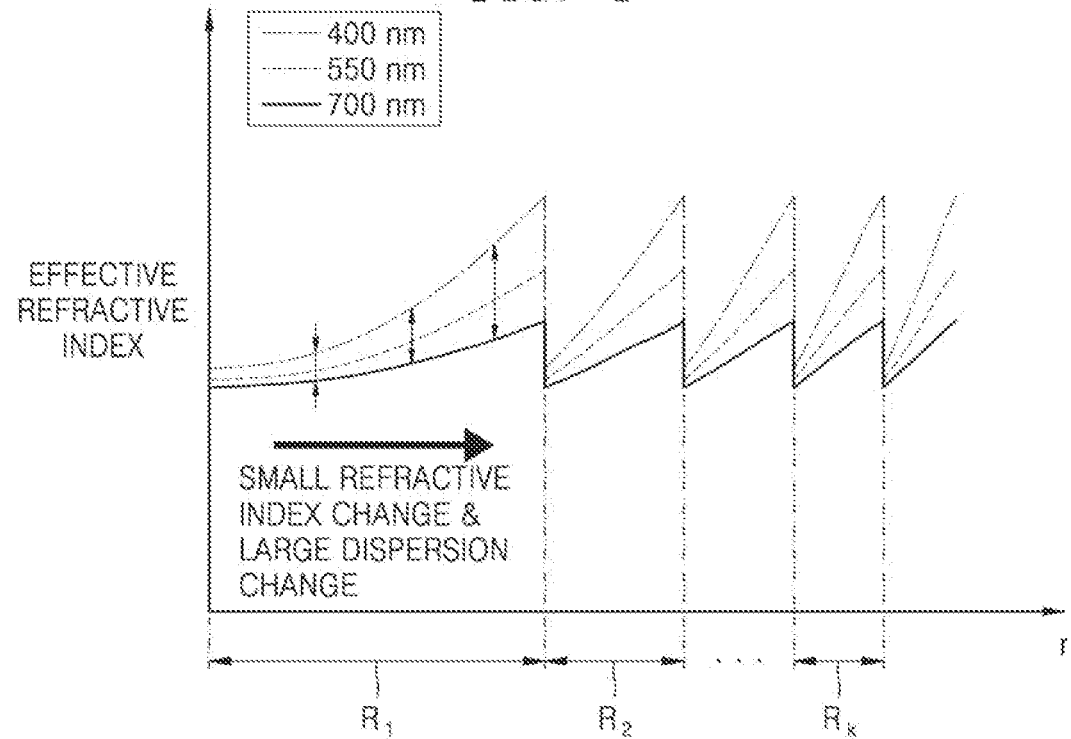
FIG. 4 is a graph showing an effective refractive index and a dispersion of a dispersion control layer of the meta-optical device of FIG. 1 according to wavelength and position.

FIG. 3 is a graph showing an effective refractive index and a dispersion of a phase delay layer of the meta-optical device 100 of FIG. 1 according to a wavelength and a location. FIG. 4 is a graph showing an effective refractive index and a dispersion of a first dispersion control layer of the meta-optical device 100 of FIG. 1 according to a wavelength and a location.

The effective refractive index is a concept assuming that a unit component of the meta-optical device 100 may be regarded as a uniform medium. When media having different refractive indexes are included in the unit component, the concept of the effective refractive index may imply a distribution of different media.

A refractive index dispersion refers to a degree ($\partial N/\partial \lambda$) to which a refractive index varies according to a wavelength, and may be understood to mean a dispersion of effective refractive indexes in a structure including media of different refractive indexes. Hereinafter, the refractive index dispersion may be referred to simply as a dispersion.

Referring to FIGS. 3 and 4 together, a phase delay layer and a first dispersion control layer are substantially opposite in terms of a tendency of change of an effective refractive index in a first direction. In the graphs, the tendency of change of an effective refractive index is shown in radial direction R. The phase delay layer may have the substantially similar tendency as the target phase delay profile in terms of a change of an effective refractive index according to a location.

According to the tendency of change of the effective refractive index, the phase delay profile represented by the phase delay layer and the target phase delay profile are the substantially similar in terms of a sign of a change rate according to a location, and the phase delay profile represented by the first dispersion control layer and the target phase delay profile may be substantially opposite in terms of a sign of a change rate according to a location. In other words, the phase delay profile represented by the phase delay layer and the phase delay profile represented by the first dispersion control layer may be substantially opposite in terms of a sign of a change rate according to a location.

The phase delay layer and the first dispersion control layer may be different in terms of a ratio $(\partial/\partial r)(\partial n/\partial \lambda)$ of a dispersion change rate according to a location.

In the case of the phase delay layers, a change rate of an effective refractive index according to a position as shown in the graph of FIG. 3 is greater than a change rate of an effective refractive index according to a position in the first dispersion control layer as shown in FIG. 4. Conversely, the phase delay layer is less than the first dispersion control layer in terms of a degree dispersion, i.e., change rate of an effective refractive index according to a wavelength. Accordingly, a dispersion change rate of the first dispersion control layer according to a position is greater than that of the phase delay layer. For this, a dispersion of the material of the second layer L2 which is the first dispersion control layer may be higher than that of the material of the first layer 11 which is the phase delay layer. For example, Si, TiO$_2$ or the like may be used as a material having a high dispersion, and SiO$_2$, Si$_3$N$_4$ or the like may be used as a material having a low dispersion. However, the above materials are only examples and embodiments are not limited thereto. A ratio of a dispersion change rate to a change rate of the effective refractive index according to a position is closely related to a dispersion, refractive index, shape distribution, etc. of a medium. For example, a dispersion change rate according to a position when a refractive index of a material of a nanostructure is less than that of a surrounding material is less than when the refractive index of the material of the nanostructure is greater than that of the surrounding material. Therefore, the dispersion change rate according to a position may be adjusted by combining materials and shapes different from those of the examples.

The graphs of FIGS. 3 and 4 show examples in which tendencies of change of an effective refractive index according to a position and dispersion change rates according to position are different in two layers, but embodiments are not limited thereto. Although it is illustrated that the above-described tendency is shown in all positions on regions $R_1$, $R_2$, . . . , $R_k$, the above-described tendency should be understood to mean a general trend occurring in most regions. For example, the substantially similar tendency of change of the effective refractive index may occur in some regions of the first layer L1 and the second layer L2.

Figure 5A:
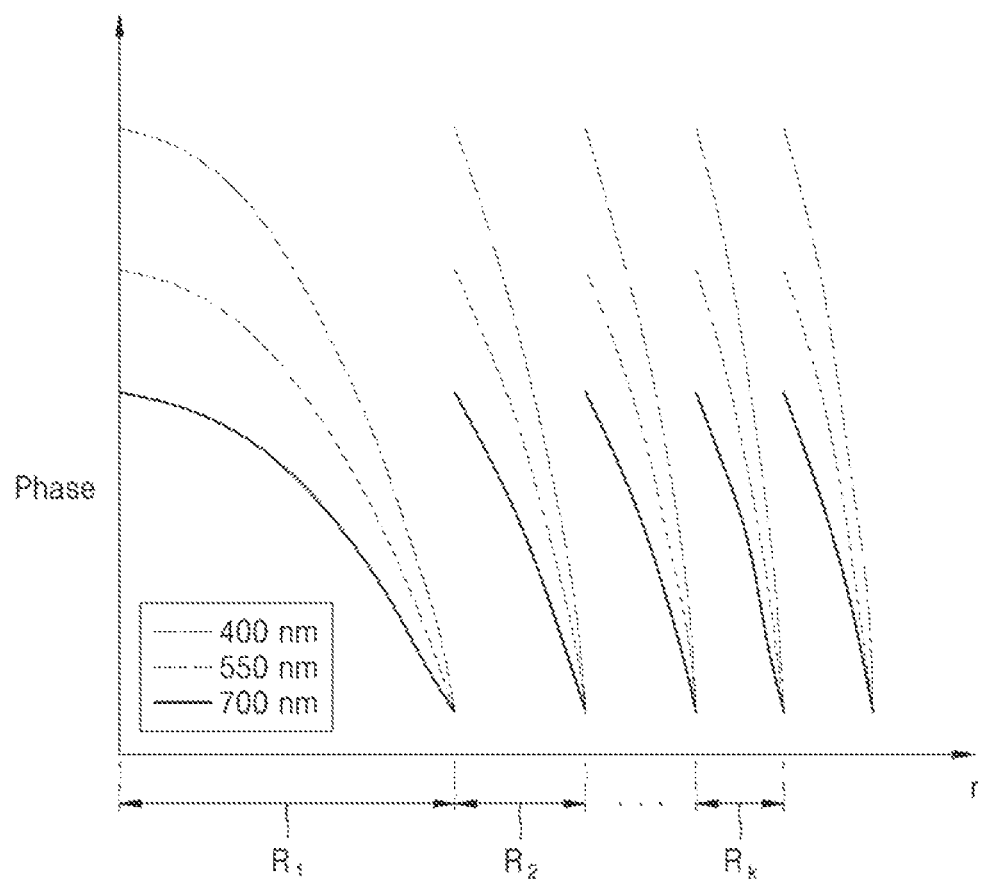
FIGS. 5A to 5C are graphs showing a phase delay profiles of a phase delay layer of the meta-optical device of FIG. 1, dispersion control layer of the meta-optical device of FIG. 1, and the meta-optical device of FIG. 1, respectively.
Figure 5B:
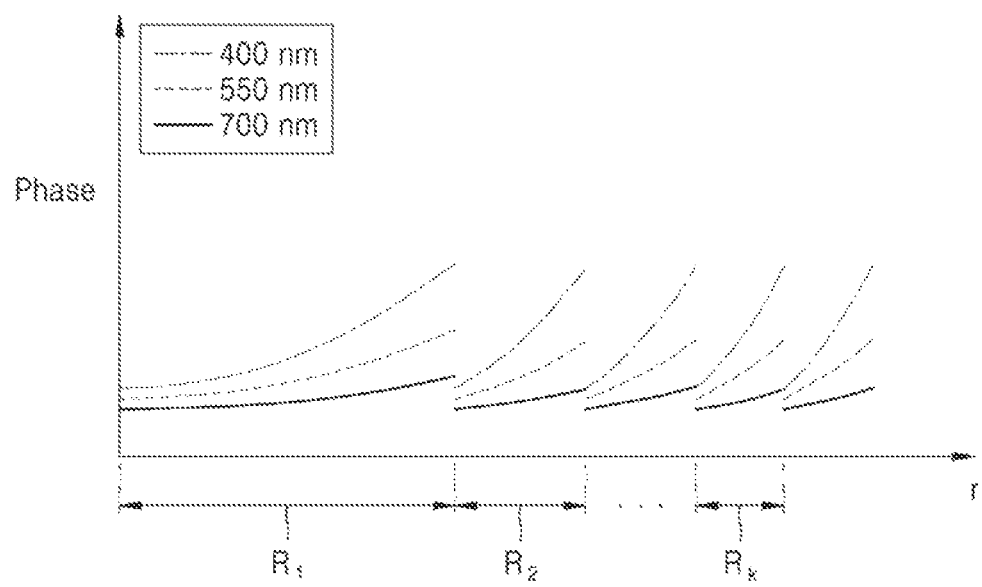
Figure 5C:
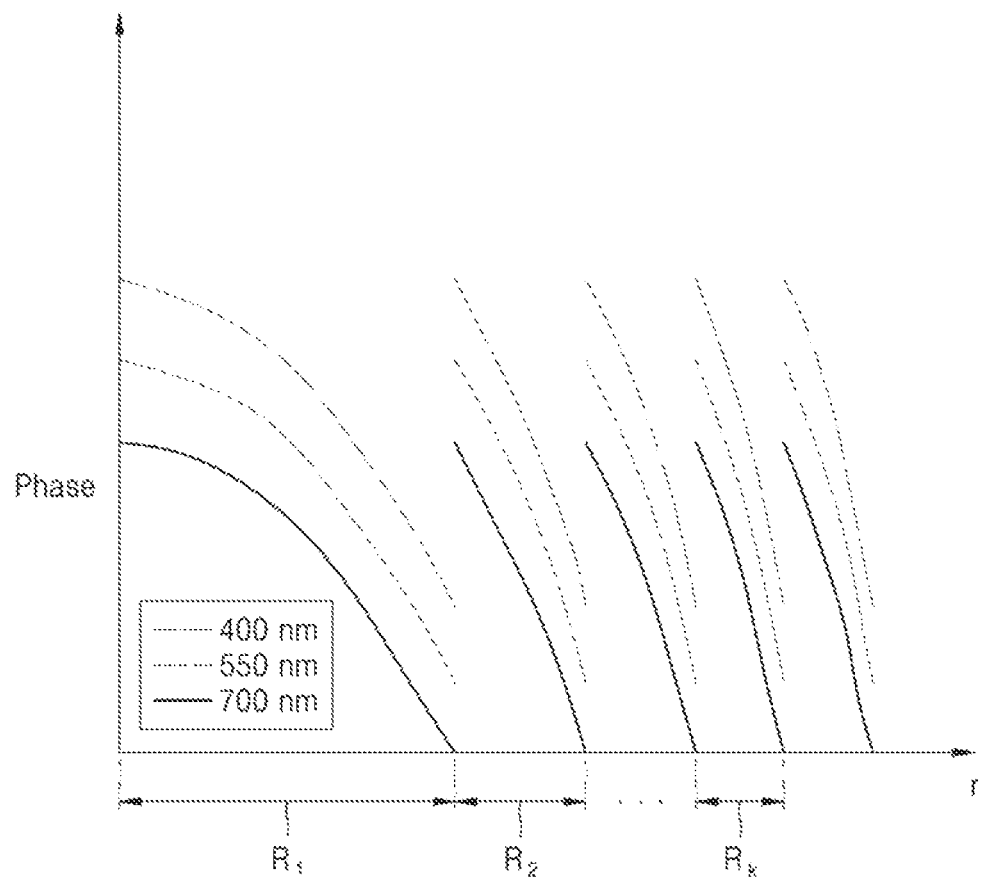

FIGS. 5A to 5C are graphs showing phase delay profiles of the phase delay layer of the meta-optical device of FIG. 1, the first dispersion control layer of the meta-optical device of FIG. 1, and the meta-optical device of FIG. 1, respectively.

According to the graph of the effective refractive index of the first layer L1 of FIG. 3, a phase delay profile of the first layer L1 is shown as FIG. 5A. According to the graph of the effective refractive index of the second layer L2 of FIG. 4, a phase delay profile of the second layer L2 is shown as FIG. 5B. According to first layer L1 second layer L2 and the third layer L3, a phase delay profile of the meta-optical device is shown as FIG. 5C.

The meta-optical device 100 including a combination of the first layer L1 exhibiting properties as shown in the graphs of FIG. 3 and FIG. 4A, the second layer L2 exhibiting properties as shown in the graphs of FIG. 4 and FIG. 4B, and the third layer L3 for offsetting a high-order dispersion, may show a phase delay profile that is hardly discontinuous according to a position and that is almost the same regardless of wavelengths.

In the graph of FIG. 5C, a phase delay profile is shifted by a constant value but has the same shape with respect to three wavelengths. This corresponds to a case in which a dispersion is 0 in a wavelength band. This is a theoretical example but a dispersion may be minimized in a desired wavelength band by controlling particular shapes and materials of a dispersion control layer and first and second dispersion control layer.

A theory from which the above-described three-layer structure for desired phase modulation in a wide wavelength band is derived will be described below.

In an ideal case, the Taylor expansion may be applied to a degree of phase modulation of meta-structures (sub-wavelength nanostructures) with n consecutive parameters $\{P_i\}=\{P_1, P_2, \ldots, P_n\}$ with respect to an angular frequency $\omega$, as follows:

$$\phi(P_i;\omega)=\phi_0+(\omega-\omega_0)\phi_1+(\omega-\omega_0)^2\phi_2+\ldots$$

When a phase change range is $2\pi$ or more and has a characteristic that does not depend on a wavelength, wide-band diffraction efficiency may be 100%. That is, $$\phi_1(P_i)=\text{const.}, \phi_2(P_i)=\text{const.}, \ldots, \phi_k(P_i)=\text{const.}$$

When a surface S subject to k constraints is considered, there is a change path $L:[0,1]\to S$ of consecutive parameters, and $$\phi(L[1])-\phi L[0])=\phi_0(\{P_i\}_{final})-\phi_0(\{P_i\}_{initial})\geq 2\pi$$

is satisfied. In this case, when the parameters are changed in the change path L to satisfy $\phi_0(P_i)=\text{mod}(\phi_{0,target}, 2\pi)+\phi(L[0])$ so as to implement a phase modulation profile $\phi_{0,target}(\vec{r})$, the phase profile may be implemented intact in a broadband except that a phase discontinuity plane Fresnel Edge is generated, and thus, 100% of diffraction efficiency may be achieved. Here, the number of constraints to present a one-dimensional (1D) path is k≤n−1 and thus only a primary dispersion may be compensated for when two degrees of freedom are provided. When three degrees of freedom are provided, a secondary dispersion may also be compensated for.

Practically, even when a surface having a characteristic that does not depend on a wavelength is implemented, high broadband diffraction efficiency may be obtained when the change path L of consecutive parameters is optimized to minimize a dispersion change rate. This may be expressed as follows:

A phase deviation of meta-structures with n parameters $\{P_i\}=\{P_1, P_2, \ldots, P_n\}$ $$\phi_{center}(\omega)=\phi_{0,center}+(\omega-\omega_0)\phi_{1,center}+(\omega-\omega_0)\phi_{2,center}+\ldots,$$

may be evaluated with respect to the following centralized dispersion:

$$FoM[\phi_{0,target}, P_i; \phi_{center}] =$$

$$\frac{1}{\int_{\omega_i}^{\omega_f} w(\omega)d\omega} \text{Re}\left\{\int_{\omega_i}^{\omega_f} w(\omega) \cdot \exp(j \cdot [\phi(P_i; \omega) - \phi_{center}(\omega) - \phi_{0,target}])d\omega\right\}$$

Here, an evaluation method may be modified. $w(\omega)$ represents a weight function according to each frequency. There is a fully continuous path $L:\phi_{0,target} \to \{P_i\}$ for maximizing an evaluation index FoM according to a given $\phi_{center}(\omega)$. That is, $$\underset{\{P_i\}}{\text{argmax}} FoM[\phi_{0,target}, P_i; \phi_{center}] = : L[\phi_{0,target}; \phi_{center}]$$

Here, $\phi_{0,target}$ is an element of $[0,2\pi]$. However, the centralized dispersion may be also optimized.

$$\underset{\phi_{center}}{\text{argmax}} \frac{1}{2\pi} \int_0^{2\pi} FoM[\phi_{0,target}, L[\phi_{0,target}; \phi_{center}]; \phi_{center}]d\phi_{0,target} = \phi^*_{center}$$

Therefore, when a fully consecutive optimal path $L^*:\phi_{0,target} \to \{P_i\}$ for a parameter space for maximizing the optimized centralized dispersion $\phi^*_{center}$ and the evaluation index FoM therefor is obtained $$\underset{\{P_i\}}{\text{argmax}} FoM[\phi_{0,target}, P_i; \phi^*_{center}] = : L[\phi_{0,target}; \phi^*_{center}]$$

(here, $\phi_{0,target}$ is an element of $[0,2\pi]$), a phase modulation profile $\phi_{0,target}(\vec{r})$ may correspond to a parameter change distribution of $P_i(\vec{r}) = L^*[\phi_{0,target}(\vec{r})]$.

Here, an available parameter spatial shaft includes the size or an arrangement rule of a meta-structure at each layer of a multi-layer structure, and the like.

Conducting an apparent dimensional analysis with a current method is difficult compared to an ideal case, however, increasing the degree of freedom of problem broadens the range of selection of the optimal path, resulting in better diffraction efficiency and selection so that dispersion of higher-order terms becomes similar.

For a multi-stage structure to effectively offset a higher-order term, it is better that dispersion characteristics of each stage be different. Maximum performance may be obtained when a phase difference due to a minute change on the optimal path $L^*:\phi_{0,target} \to \{P_i\}$ does not depend on a wavelength. That is, with respect to a minute change $dP_i$ according to the optimal path $L^*$, $$\frac{\partial \phi}{\partial P_i} dP_i \to d\phi_{0,target}$$

is satisfied and differently contribute to a change of each parameter in this case. That is, when $$\frac{\partial \phi}{\partial P_i} = f_{P_i}(\omega) = f_{P_i,0} + f_{P_i,1}(\omega - \omega_0) + f_{P_i,2}(\omega - \omega_0)^2 + \ldots ,$$

a unit vector $u_L^*$ parallel to the minute change may be replaced with k constraints $$f_{P_i,0} \cdot u_L^* \neq 0, f_{P_i,j} \cdot u_L^* = 0$$

(j=1, ... k).

In order to increase the k constraints to (n−1) ideal conditions, a matrix $F_{ij}=[f_{P_{i,j}}]$ (i=1, ... n, j=0, ... k) should be nontrivial so that an inverse thereof may be found, and thus, $$u_{L^*} \| F_{ij}^{-1} \begin{bmatrix} 1 \\ 0 \\ \vdots \\ 0 \end{bmatrix}$$

may be used to determine a direction of a minute change in the optimal path. That is, there is the optimum path. In this case, k=n−1. A trivial case, i.e., a case when dispersion characteristics of the stages are similar or the same, the inverse is singular, and thus, generally, k≤n−1.

A dispersion of each layer may be determined by a material value, shape and arrangement of a meta-structure. Therefore, the material value, shape and arrangement of the meta-structure may be elements of a broadband high-efficiency multi-stage structure because each dispersion characteristic changes when one or more modifications are made thereto.

A change of a height of each layer may be considered as an element that does not greatly affect a rank of a matrix, because it is expected that a phase difference proportional to the height may be obtained in the case of a meta-structure having a high aspect ratio.

$$F_{ij} = [f_{P_{i,j}}] = [f_{P_{i,j}}/h_j]\begin{bmatrix} h_1 & 0 & 0 \\ 0 & \ddots & 0 \\ 0 & 0 & h_k \end{bmatrix} := F'_{i,j} \cdot \text{diag}(h_k)$$

In order to minimize the height, comprehensive optimization of the material, shape, and arrangement method of the multi-stage structure is needed and may be intuitively described as follows.

A one-stage equivalent structure is implemented to satisfy a phase change range of $2\pi$ by selecting a structure having a low dispersion but capable of significantly changing a phase to a great extent. A two-stage equivalent structure is configured to offset a dispersion, in addition to the one-stage equivalent structure. In the two-stage equivalent structure, a dispersion change range relative to a phase change range is set to as high as possible to minimize a height. The second-stage equivalent structure is configured to mainly compensate for a primary dispersion. In a three-stage equivalent structure, a secondary dispersion change range relative to a phase change range is set to be high to mainly compensate for a secondary dispersion.

Figure 6:
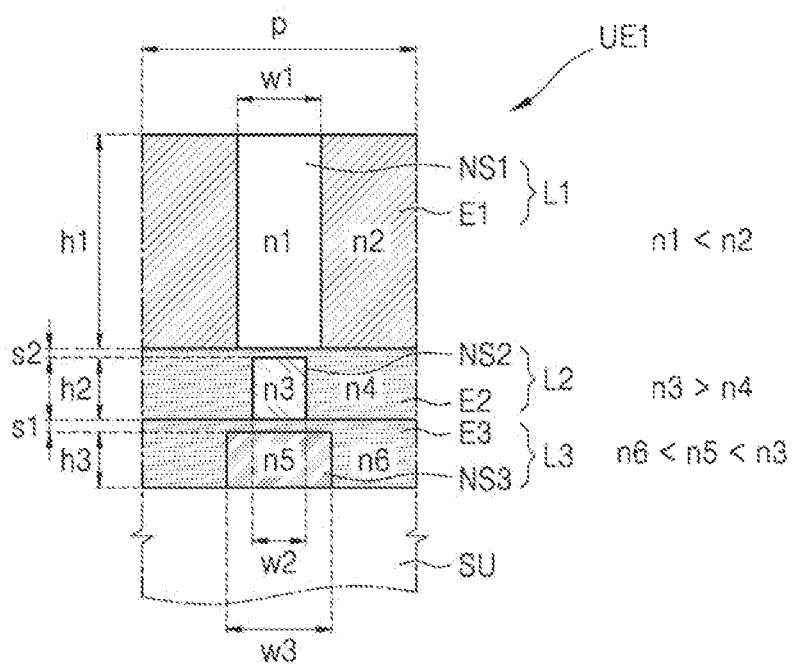
FIG. 6 is a cross-sectional view showing a shape and a refractive index arrangement of a unit component that may be employed in the meta-optical device of FIG. 1.

FIG. 6 is a cross-sectional view showing a particular shape and a refractive index arrangement of a unit component that may be employed in the meta-optical device of FIG. 1.

A unit component UE1 may be repeatedly provided in the meta-optical device 100 by changing detailed dimensions according to a location thereof.

A first layer L1 includes a first nanostructure NS1 and a first surrounding material E1 surrounding the first nanostructure NS1. A refractive index n1 of the first nanostructure NS1 may be lower than a refractive index n2 of the first surrounding material E1. The first nanostructure NS1 may be an empty space, i.e., air, and may have a shape in which the first surrounding material E1 is engraved with a certain width and depth. Hereinafter, when a nanostructure is described as having a lower refractive index than a refractive index of a surrounding material, it should be understood to include a case in the nanostructure includes air, i.e., a case in which the nanostructure has an engraved empty hole shape.

A second layer L2 includes a second nanostructure NS2 and a second surrounding material E2 surrounding the second nanostructure NS2. The second nanostructure NS2 may be formed of a material having a refractive index n3 higher than a refractive index n4 of the second surrounding material E2. A third layer L3 includes a third nanostructure NS3 and a third surrounding material E3 surrounding the second nanostructure NS3. The third nanostructure NS3 may be formed of a material having a refractive index n5 higher than a refractive index n6 of the third surrounding material E3. The refractive index n5 of the third nanostructure NS3 may be lower than the refractive index n3 of the second nanostructure NS2.

The second surrounding material E2 may extend to cover the second nanostructure NS2 to form a gap s2 between the first nanostructure NS1 and the second nanostructure NS2, and the third surrounding material E3 may extend to cover the third nanostructure NS3 to form a gap s1 between the second nanostructure NS2 and the third nanostructure NS3. The gaps s1 and s2 are examples and may be zero.

The first nanostructure NS1, the second nanostructure NS2, and the third nanostructure NS3 may each have sub-wavelength dimensions. Widths w1, w2, and w3 of the respective first nanostructure NS1, the second nanostructure NS2, and the third nanostructure NS3 may be sub-wavelengths, and a pitch P of the unit component UE1 may also be a sub-wavelength.

The first nanostructure NS1 may have an aspect ratio greater than 1 to avoid optical resonance therein. That is, h1/w1 may be greater than 1, and may be greater than, for example, 2. A height of the first nanostructure NS1 with respect to a center wavelength $\lambda_0$ of the wavelength band may be in a range of $2\lambda_0$ to $5\lambda_0$.

A height h2 of the second nanostructure NS2 and a height h3 of the third nanostructure NS3 may be each in a range of $0.5\lambda_0$ 0 to $2\lambda_0$ with respect to the central wavelength $\lambda_0$ of the wavelength band.

A substrate SU for supporting a first layer L1, a second layer L2, and a third layer L3 may be further provided. The substrate SU may have a transparent property with respect to light of an operating wavelength band of the meta-optical device 100, and may be formed of glass (fused silica, BK7, or the like), quartz, polymer (PMMA, BK7, or the like), or another transparent plastic. A refractive index of the substrate SU may be equal to or less than the refractive index n6 of the third surrounding material E3. As shown in FIG. 6, the third layer L3 may be provided on the substrate SU and thereafter the second layer L2 and the first layer L1 may be provided thereon. This arrangement is intended to reduce a change of an effective refractive index between adjacent layers as small as possible and may be changed to an order of the first layer L1, the third layer L3, and the second layer L2 according to the refractive indexes n1 and n2.

Figure 7:
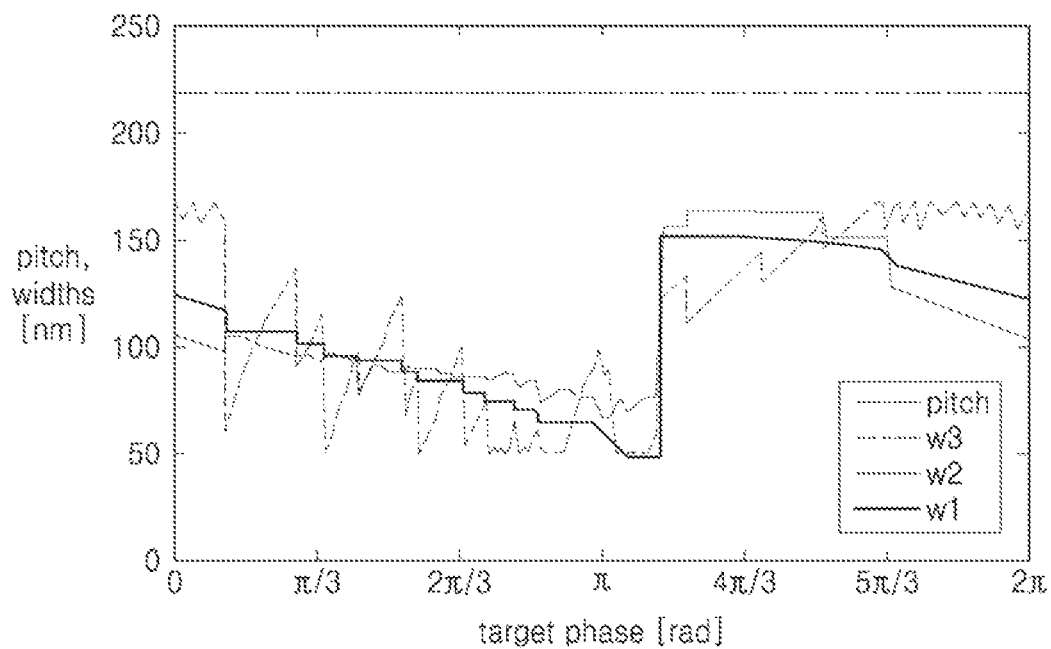
FIG. 7 is a graph showing computer simulation results with regard to a phase according to a size change of the unit component of FIG. 6.
Figure 8:
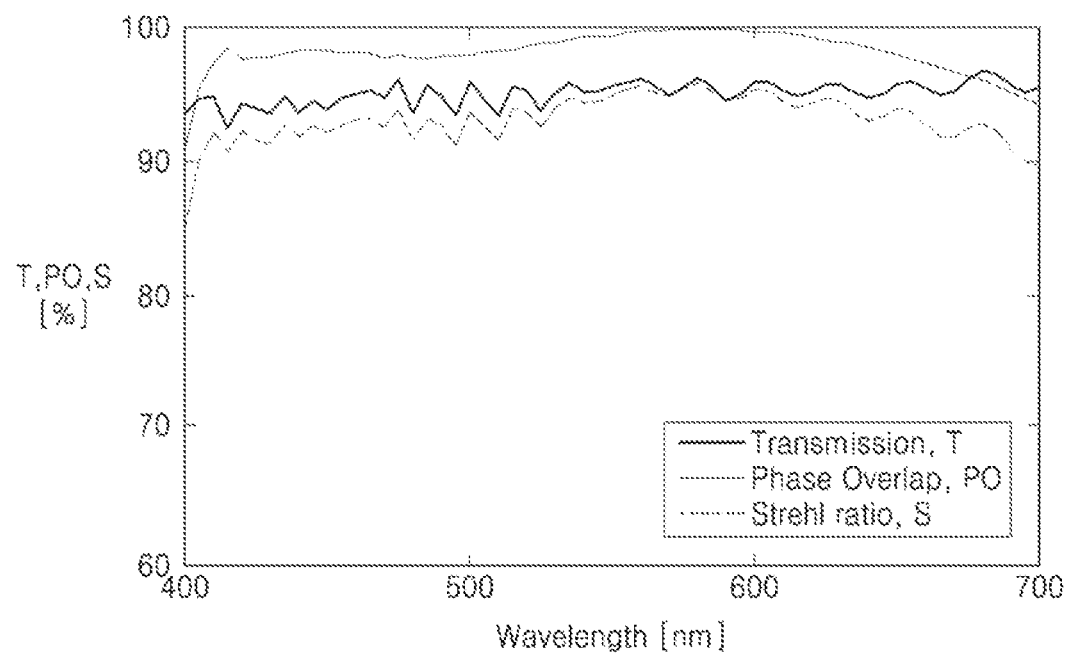
FIG. 8 is a graph showing computer simulation results regarding a transmittance and efficiency of a meta-optical device based on the computer simulation results of FIG. 7.

FIG. 7 is a graph showing computer simulation results with regard to a phase according to a size change of the unit component UE1 of FIG. 6. FIG. 8 is a graph showing computer simulation results of a transmittance and efficiency of a meta-optical device according to the computer simulation results of FIG. 7.

In the computer simulation of FIG. 7, h1 was 3 µm, and h2 and h3 were each 0.8 µm. With respect to light having a wavelength of 550 nm, the refractive index n1 of the first nanostructure NS1 was 1.4599, the refractive index n2 of the first surrounding material E1 was 2.2706, the refractive index n3 of the second nanostructure NS2 was 2.2706, the refractive index n4 of the second surrounding material E2 was 1.4599, the refractive index n5 of the third nanostructure NS3 was 1.7896, and the refractive index 66 of the third surrounding material E3 was 1.4599.

Referring to FIG. 7, a particular shape included in the unit component UE1, that is, the width w1 of the first nanostructure NS1, the width w2 of the second nanostructure NS2, and the width w3 of the third nanostructure NS3, may be set appropriately according to a phase delay value required at each position to achieve desired optical performance.

In the graph of FIG. 8, 'Phase Overlap' and 'Strehl ratio' respectively represent a concept corresponding to diffraction efficiency and a concept corresponding to condensing efficiency. Three features, i.e., transmittance T, diffraction efficiency PO, and convergence efficiency S, were generally constant and good in a wavelength band of 400 to 700 nm. Particularly, a bandwidth at which the diffraction efficiency PO is 97% or more was about 250 nm. A ratio of a bandwidth of 300 nm at which the diffraction efficiency PO is 90% of more to a central wavelength of 550 nm was 54% or more.

Figure 9:
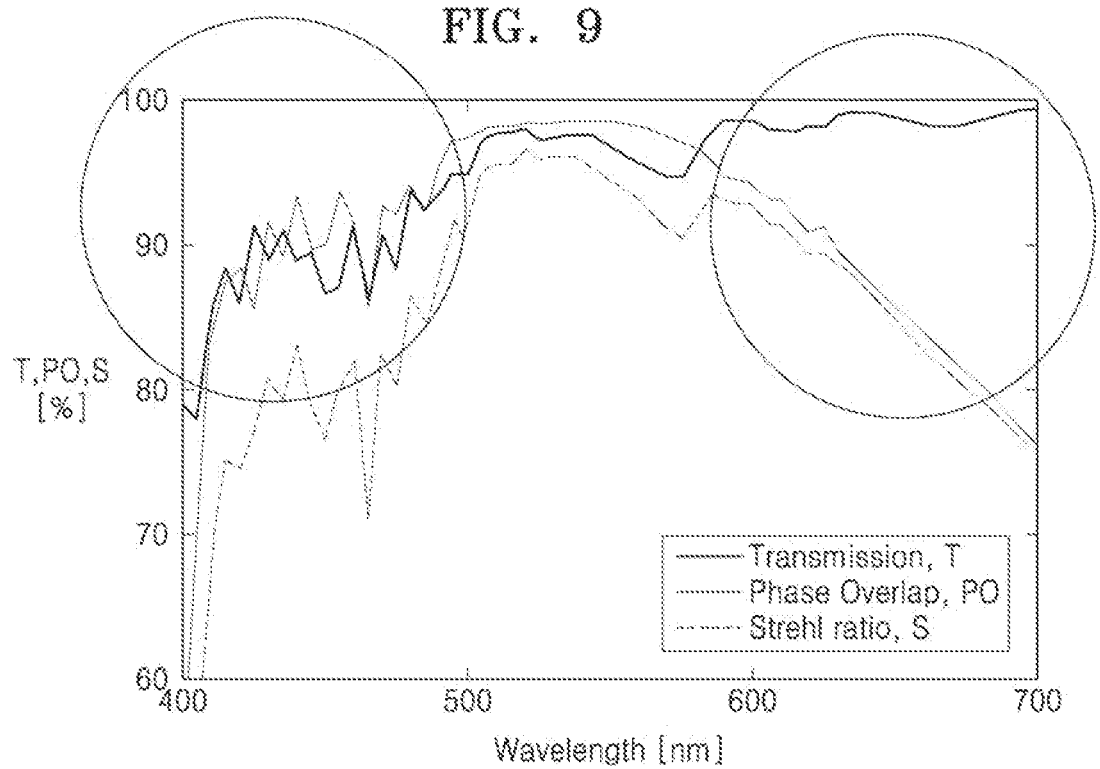
FIG. 9 is a graph showing a computer simulation results regarding a transmittance and efficiency of a meta-optical device of a comparative example.

FIG. 9 is a graph showing a computer simulation of transmittance and efficiency of a meta-optical device of a comparative example.

The meta-optical device of the comparative example is an example embodied as a single-layer structure. Referring to the graph, transmittance T, diffraction efficiency PO, and condensing efficiency S were high at a center region of a wavelength band of 400 to 700 nm but were very lower in a peripheral region. A decrement indicated by a left circle may be evaluated as a decrement due to diffraction in an unintended direction, and a decrement indicated by a right circle may be evaluated as a decrement due to lack of a phase.

Figure 10:
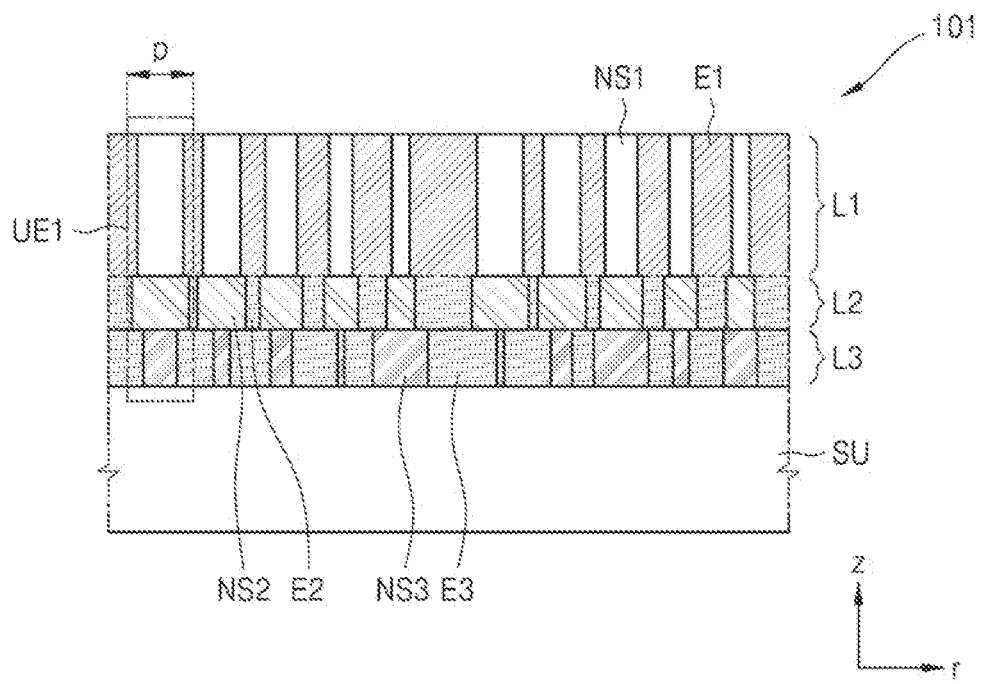
FIG. 10 is a schematic cross-sectional view illustrating a structure of a meta-optical device according to an example embodiment.

FIG. 10 is a schematic cross-sectional view illustrating a structure of a meta-optical device according to an embodiment.

A meta-optical device 101 has a structure to which the unit component UE1 of FIG. 6, when functioning as a lens, is applied. However, s1 and s2 are omitted for convenience of explanation and an appropriate gap may be set. In the following embodiments, it is shown that there is no gap between nanostructures of each of different layers, but this is an example for convenience of explanation and certain gaps may be formed.

On a first layer L1, first nanostructures NS1 having a lower refractive index than a first surrounding material E1 are arranged in a direction such that a width thereof decreases. On a second layer L2, second nanostructures NS2 having a higher refractive index than a second surrounding material E2 are arranged in a direction such that a width thereof decreases. The direction may be the radial direction R illustrated in FIG. 2. The first layer L1 and the second layer L2 show the substantially similar tendency of change of a width in a direction away from of a center of the meta-optical device 101 and thus are opposite in terms of a sign of a phase modulation tendency. The second layer L2 shows a different tendency of change of a refractive index in terms of a sign of a refractive index from the first layer L1 and may mainly compensate for a primary dispersion occurring in the first layer L1.

A third layer L3 includes a third nanostructure NS3 having a higher refractive index than that of a third surrounding material E3. The third nanostructure NS3 may be formed of a material having a lower refractive index and a lower dispersion than those of the second nanostructured NS2. The third layer L3 may mainly compensate for high-order dispersions.

Meta-optical devices according to various modified examples will be described below. The meta-optical devices will now be described focusing on differences from the meta-optical devices of the previous embodiments.

Figure 11A:
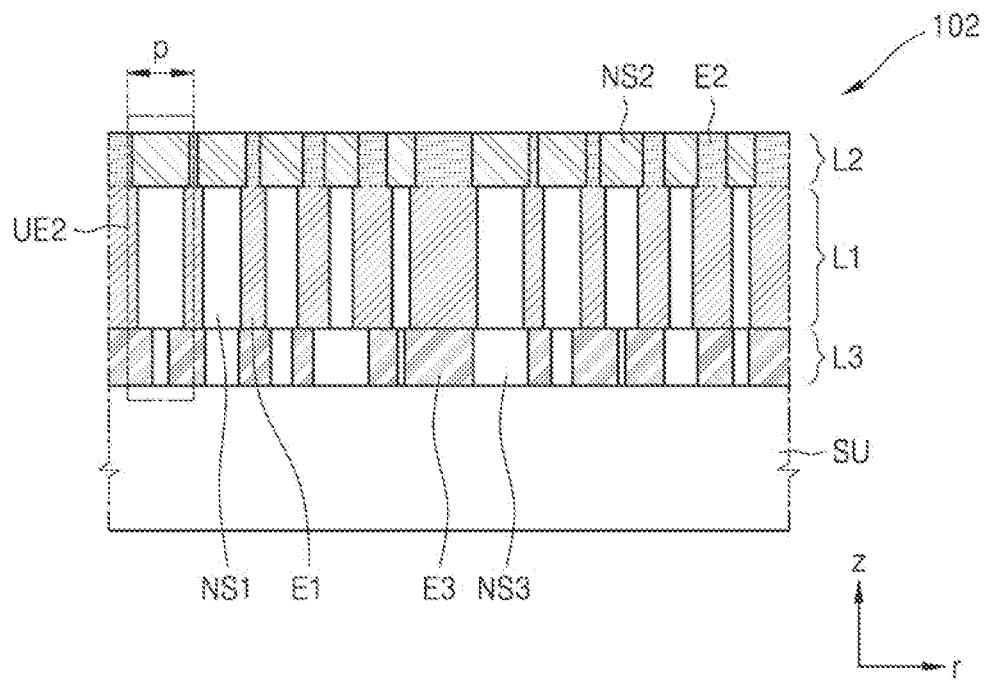
FIG. 11A is a schematic cross-sectional view illustrating a structure of a meta-optical device according to another example embodiment.
Figure 11B:
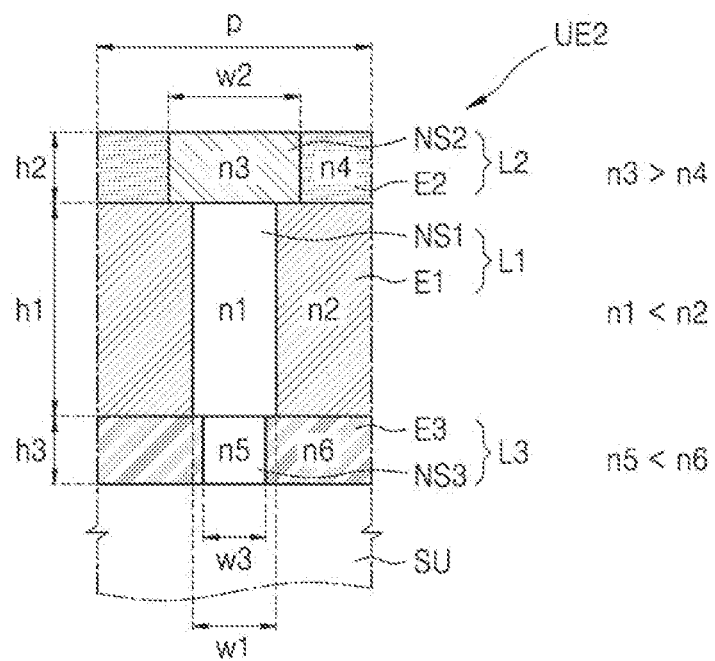
FIG. 11B is a cross-sectional view illustrating a refractive index arrangement of a unit component of the meta-optical device of FIG. 11A.

FIG. 11A is a schematic cross-sectional view illustrating a structure of a meta-optical device according to another embodiment. FIG. 11B is a cross-sectional view illustrating a refractive index arrangement of a unit component of the meta-optical device of FIG. 11A.

A unit component UE2 of a meta-optical device 102 is different from the meta-optical device 101 of FIG. 10 in terms of a refractive index arrangement of a third layer L3, and thus, the third layer L3, a first layer L1, and a second layer L2 are sequentially arranged on a substrate SU.

On the third layer L3, a refractive index n5 of a third nanostructure NS3 is less than a refractive index n6 of a third surrounding material E3. Accordingly, the first layer L1 may be provided on the third layer L3 and the second layer L2 may be provided on the first layer L1 to reduce a rate of change of a refractive index between adjacent layers as small as possible.

Figure 12A:
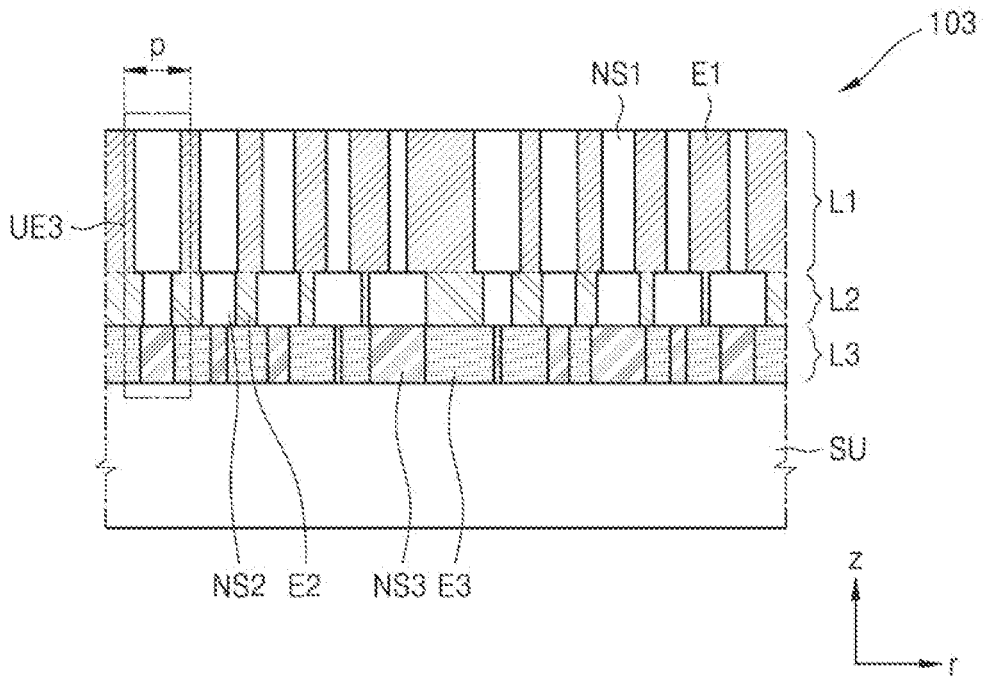
FIG. 12A is a schematic cross-sectional view illustrating a structure of a meta-optical device according to another example embodiment.
Figure 12B:
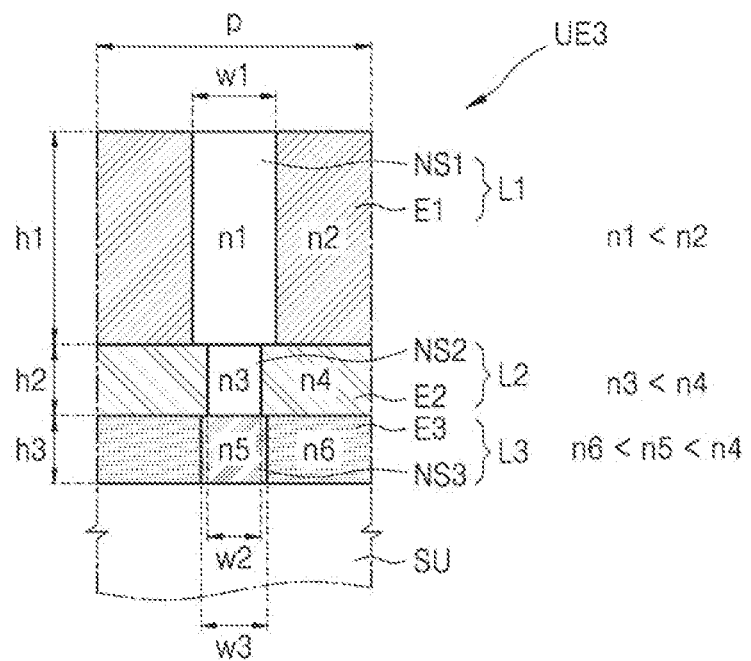
FIG. 12B is a cross-sectional view illustrating a refractive index arrangement of a unit component of the meta-optical device of FIG. 12A.

FIG. 12A is a schematic cross-sectional view illustrating a structure of a meta-optical device according to another embodiment. FIG. 12B is a cross-sectional view illustrating a refractive index arrangement of a unit component of the meta-optical device of FIG. 12A.

A unit component UE3 of a meta-optical device 103 is different from the meta-optical device 101 of FIG. 10, in that a refractive index n3 of a second nanostructure NS2 is changed to be lower than a refractive index n4 of a second surrounding material E2, thereby changing a tendency of change of a width w2 of the second nanostructure NS2. The width w2 of the second nanostructure NS2 according to a position is set to be substantially opposite to a tendency of change of a width w1 of a first nanostructure NS1. Accordingly, a first layer L1 and a second layer L2 are substantially opposite in terms of a change of an effective refractive index according to a position, and are substantially opposite in terms of change of phase modulation according to a position.

Figure 13A:
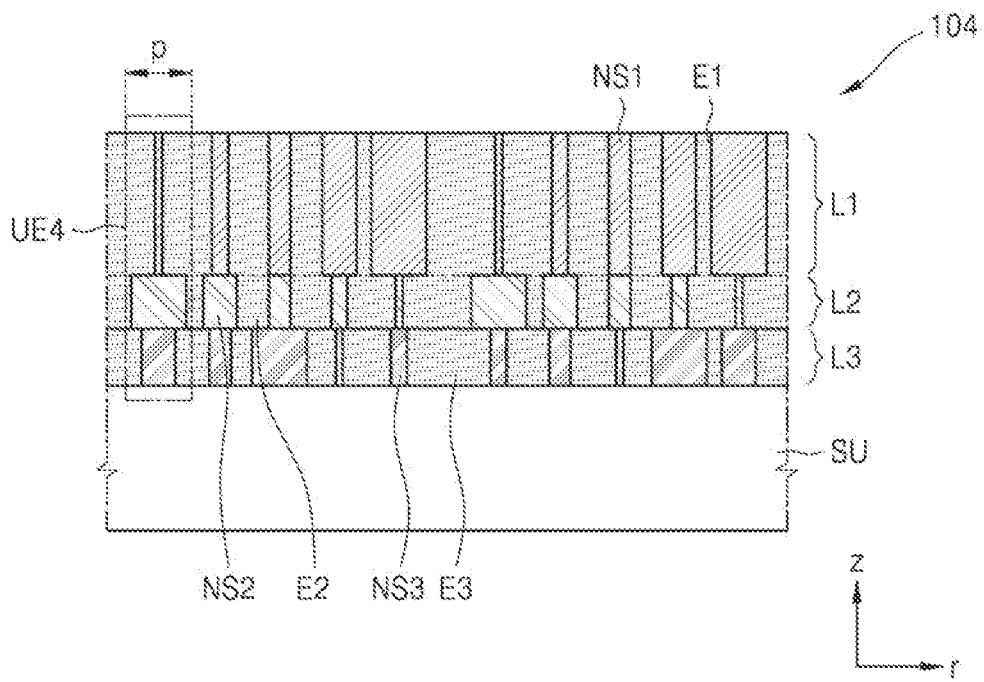
FIG. 13A is a schematic cross-sectional view illustrating a structure of a meta-optical device according to another example embodiment.
Figure 13B:
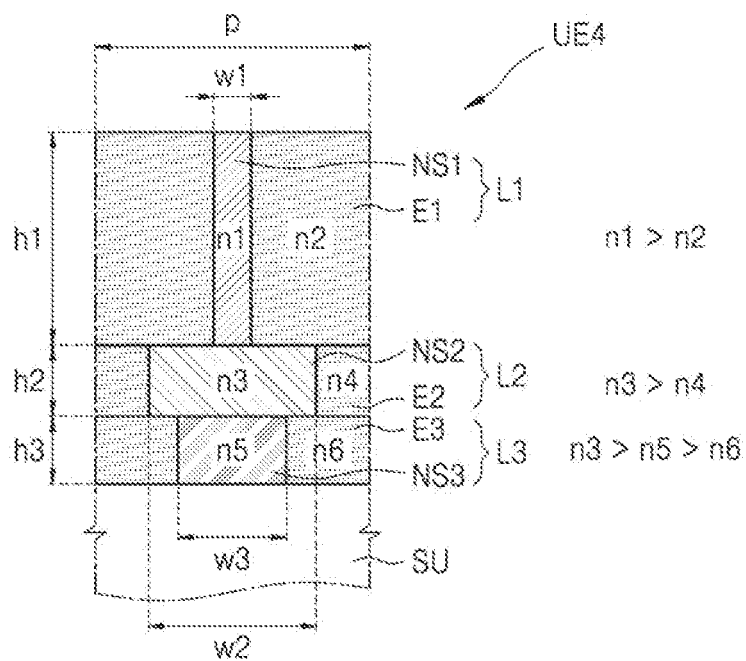
FIG. 13B is a cross-sectional view illustrating a refractive index arrangement of a unit component of the meta-optical device of FIG. 13A.

FIG. 13A is a schematic cross-sectional view illustrating a structure of a meta-optical device according to another embodiment. FIG. 13B is a cross-sectional view illustrating a refractive index arrangement of a unit component of the meta-optical device of FIG. 13A.

A unit component UE4 of a meta-optical device 104 is different from the meta-optical device 101 of FIG. 10 in that a first nanostructure NS1 having a higher refractive index n1 than a refractive index n2 of a first surrounding material E1 is provided on a first layer L1.

A width w1 of the first nanostructure NS1 and a width w2 of a second nanostructure NS2 at each position are set such that that tendencies of change of the width w1 of the first nanostructure NS1 and the width w2 of the second nanostructure NS2 according to a position are substantially opposite to each other.

Figure 14A:
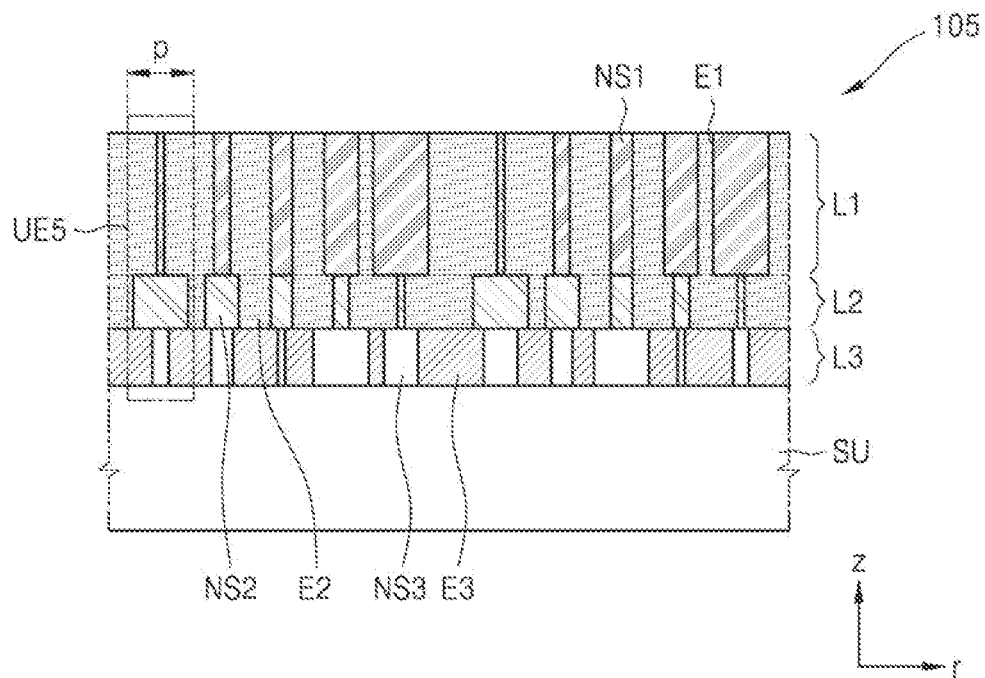
FIG. 14A is a schematic cross-sectional view illustrating a structure of a meta-optical device according to another example embodiment.
Figure 14B:
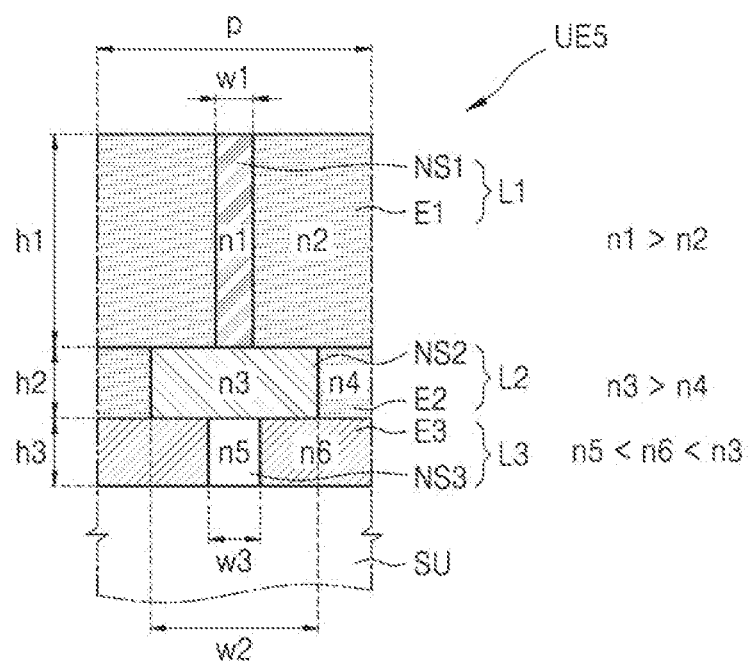
FIG. 14B is a cross-sectional view illustrating a refractive index arrangement of a unit component of the meta-optical device of FIG. 14A.

FIG. 14A is a schematic cross-sectional view illustrating a structure of a meta-optical device according to another embodiment. FIG. 14B is a cross-sectional view illustrating a refractive index arrangement of a unit component of the meta-optical device of FIG. 14A.

A unit component UE5 of a meta-optical device 105 is different from the meta-optical device 104 of FIGS. 13A and 13B in that a refractive index n5 of a third nanostructure NS3 is less than a refractive index n6 of a third surrounding material E3. The refractive index n6 of the third surrounding material E3 may be lower than the refractive index n3 of a second nanostructure NS2.

FIGS. 15A to 15D illustrate examples of a shape of a nanostructure that may be employed in a meta-optical device, according to embodiments.

Figure 15A:
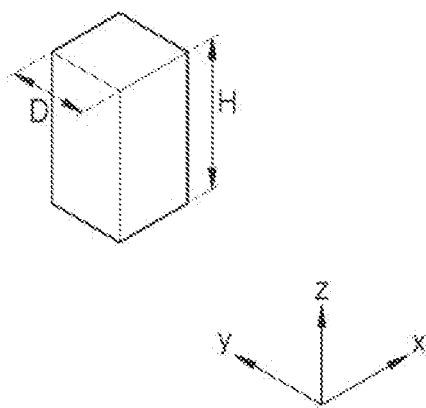
FIGS. 15A to 15D illustrate examples of a shape of a nanostructure that may be employed in a meta-optical device according to example embodiments.
Figure 15B:
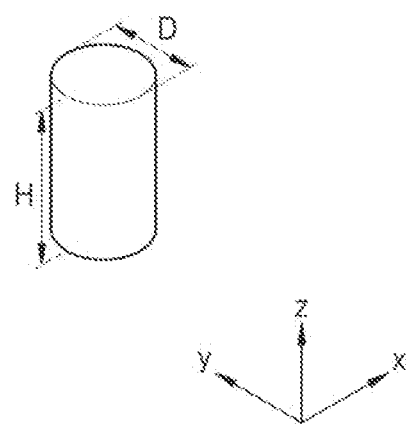
Figure 15C:
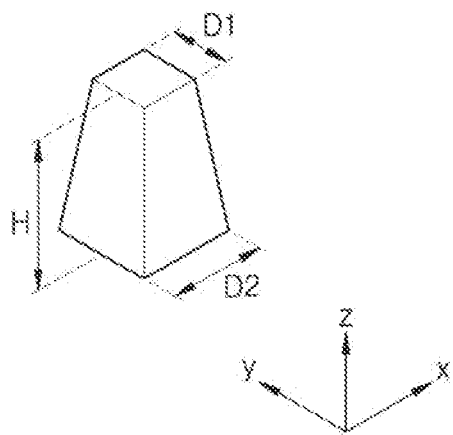
Figure 15D:
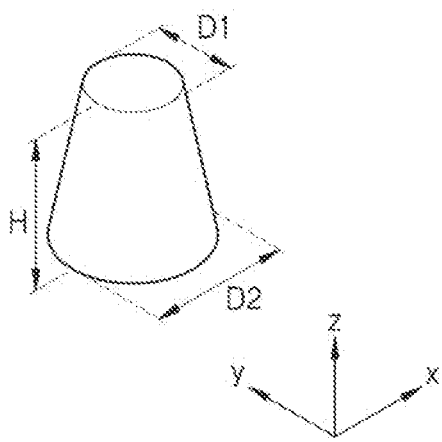

The first nanostructure NS1, the second nanostructure NS2, and the third nanostructure NS3 employed in the meta-optical devices 100, 101, 102, 103, 104, and 105 may have a square column shape as illustrated in FIG. 15A or a cylindrical shape as illustrated in FIG. 15B. Here, a height H may correspond to h1, h2, and h3 and a width D may correspond to w1, w2, and w3. A truncated cone shape as illustrated in FIG. 15C or a truncated quadrangular pyramid shape as illustrated in FIG. 15D may be used.

In addition, a rectangular shape, a cross-shape, a polygonal shape, an oval shape, a circular ring shape, a polygonal ring shape, various pillar shapes, or a truncated corn shape may be used as a shape of a cross-section. When a ring shape is employed as a shape of a cross section, a different material may be applied to the inside and a ring portion of the cross section.

Not only the above general shapes but also shapes having partial sub-features may be applied to the first nanostructure NS1, the second nanostructure NS2, and the third nanostructure NS3. For example, a feature of a concave or convex shape of a certain size may be added to the shapes illustrated in FIGS. 15A to 15D.

The above-described meta-optical devices may exhibit various optical functions by setting a target phase profile according to optical performance in a desired wavelength band. In addition, optical efficiency indicating the above-described optical functions may increase because phase discontinuity may be minimized. Because a sign of a phase delay dispersion $\partial \varphi / \partial \lambda$ according to a wavelength may be adjusted to be greater than 0 or less than 0, various types of performance may be implemented.

The meta-optical devices described above are applicable to various types of electronic devices. For example, such a meta-optical device may be installed in electronic devices, such as a smartphone, a wearable device, an Internet-of-Things (IoT) device, a household electronic appliance, a tablet personal computer (PC), a personal digital assistant (PDA), a portable multimedia player (PMP), a navigation device, a drone, a robot, an unmanned automobile, an autonomous vehicle, and an advanced driver assistance system (ADAS).

Figure 16:
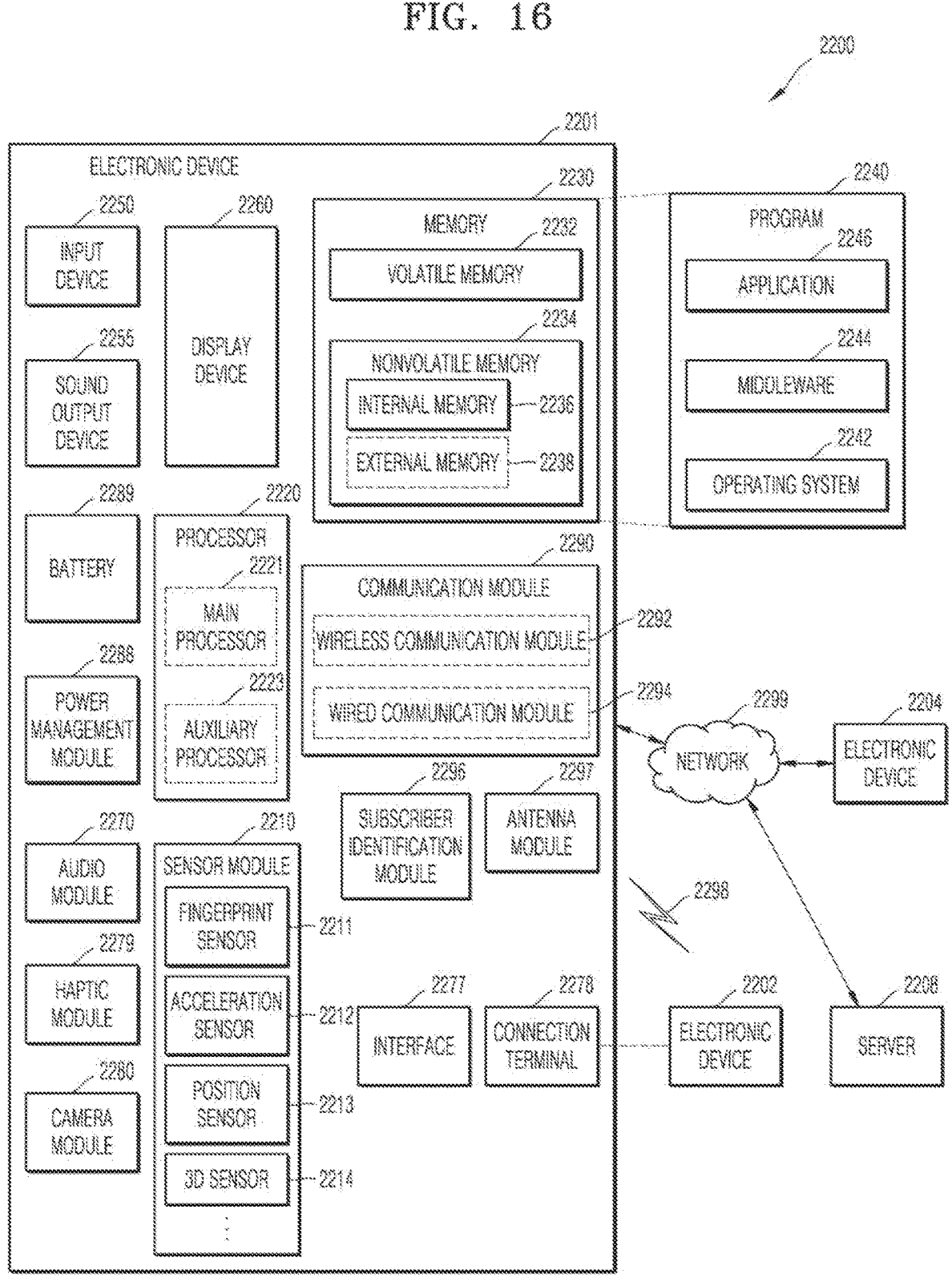
FIG. 16 is a schematic block diagram of an electronic device according to an example embodiment.

FIG. 16 is a schematic block diagram of an electronic device according to an embodiment.

Referring to FIG. 16, in a network environment 2200, an electronic device 2201 may communicate with another electronic device 2202 through a first network 2298 (e.g., a short-range wireless communication network, or the like) or communicate with another electronic device 2204 and/or a server 2208 through a second network 2299 (e.g., a long-distance wireless communication network, or the like). The electronic device 2201 may communicate with the electronic device 2204 through the server 2208. The electronic device 2201 may include a processor 2220, a memory 2230, an input device 2250, a sound output device 2255, a display device 2260, an audio module 2270, a sensor module 2210, an interface 2277, a haptic module 2279, a camera module 2280, a power management module 2288, a battery 2289, a communication module 2290, a subscriber identification module 2296, and/or an antenna module 2297. In the electronic device 2201, some (e.g., the display device 2260) of these components may be omitted or other components may be added. Some of these components may be embodied together as one integrated circuit. For example, a fingerprint sensor 2211, an iris sensor, an illuminance sensor, and the like of the sensor module 2210 may be embedded in the display device 2260 (e.g., a display, etc.).

The processor 2220 may execute software (e.g., a program 2240) to control one of electronic devices 2201 connected thereto or a plurality of other components (e.g., hardware, software components, etc.), and perform various data processing or operations. As part of data processing or operations, the processor 2220 may load commands and/or data received from other components (e.g., the sensor module 2210, the communication module 2290, etc.) to a volatile memory 2232, process a command and/or data stored in the volatile memory 2232, and store resulting data in a non-volatile memory 2234. The processor 2220 may include a main processor 2221 (e.g., a central processing unit, an application processor or the like), and an auxiliary processor 2223 (e.g., a graphical processing device, an image signal processor, a sensor hub processor, a communication processor, or the like) operable independently of or together with the main processor 2221. The auxiliary processor 2223 may use less power than the main processor 2221 and perform a specialized function.

The auxiliary processor 2223 may control functions related to some components of the electronic device 2201 (e.g., the display device 2260, the sensor module 2210, the communication module 2290, etc.) and/or states of the components, in place of the main processor 2221 while the main processor 2221 is in an inactive state (e.g., a sleep state) or together with the main processor 2221 while the main processor 2221 is in an active state (e.g., an application execution state). The auxiliary processor 2223 (e.g., an image signal processor, a communication processor, or the like) may be implemented as part of another component (e.g., the camera module 2280, the communication module 2290, or the like) which is functionally relevant thereto.

The memory 2230 may store various types of data necessary for the components (e.g., the processor 2220, the sensor module 2210, etc.) of the electronic device 2201. The data may include, for example, software (e.g., a program 2240, etc.) and input data and/or output data regarding a command associated thereto. The memory 2230 may include the volatile memory 2232 and/or the nonvolatile memory 2234.

The program 2240 may be stored as software in the memory 2230, and include an operating system 2242, middleware 2244, and/or an application 2246.

The input device 2250 may receive commands and/or data to be used with respect to the components (e.g., the processor 2220, etc.) of the electronic device 2201 from the outside (e.g., a user, etc.) of the electronic device 2201. The input device 2250 may include a microphone, a mouse, a keyboard, and/or a digital pen (e.g., a stylus pen, etc.).

The sound output device 2255 may output a sound signal to the outside of the electronic device 2201. The sound output device 2255 may include a speaker and/or a receiver. The speaker may be used for general purposes, e.g., to play back multimedia or reproduce recorded data, and the receiver may be used to receive a calling call. The receiver may be coupled to the speaker as a part of the speaker or may be implemented as a separate device independently of the speaker.

The display device 2260 may visually provide information to the outside of the electronic device 2201. The display device 2260 may include a display, a hologram device, or a projector, and a control circuit for controlling the display, the hologram device, or the projector. The display device 2260 may include a touch circuitry configured to sense a touch and/or a sensor circuit (such as a pressure sensor) configured to measure the intensity of a force generated by a touch.

The audio module 2270 may convert sound into an electrical signal or an electrical signal into sound. The audio module 2270 may obtain sound through the input device 2250 or may output sound through the sound output device 2255, a speaker of another electronic device (e.g., an electronic device 2202) connected to the electronic device 2201 directly or wirelessly, and/or a headphone.

The sensor module 2210 may detect an operating state (e.g., power, temperature, etc.) of the electronic device 2201 or an external environmental state (a user's state, etc.), and generate an electrical signal and/or a data value corresponding to the detected state. The sensor module 2210 may include the fingerprint sensor 2211, an acceleration sensor 2212, a position sensor 2213, a 3D sensor 2214, etc., and may further include an iris sensor, a gyro sensor, a pressure sensor, a magnetic sensor, a grip sensor, a proximity sensor, a color sensor, an infrared (IR) sensor, a biosensor, a temperature sensor, a humidity sensor, and/or an illuminance sensor.

The 3D sensor 2214 may be configured to sense a shape or movement of an object by emitting light to the object and analyzing light reflected from the object, and may include one of the meta-optical devices 100, 101, 102, 103, 104, and 105 according to the above-described embodiments.

The interface 2277 may support one or more specified protocols for directly or wirelessly connecting the electronic device 2201 to another electronic device (e.g., the electronic device 2202, etc.). The interface 2277 may include a high-definition multimedia interface (HDMI), a universal serial bus (USB) interface, a secure digital (SD) card interface, and/or an audio interface.

A connection terminal 2278 may include a connector for physically connecting the electronic device 2201 to another electronic device (e.g., the electronic device 2202, etc.). The connection terminal 2278 may include a HDMI connector, a USB connector, an SD card connector, and/or an audio connector (a headphone connector, etc.).

The haptic module 2279 may convert an electrical signal into a mechanical stimulus (e.g., vibration, a motion, etc.) or an electrically stimulus so that a user may recognize the electrical signal through a tactile or exercise sensation. The haptic module 2279 may include a motor, a piezoelectric element, and/or an electrical stimulation device.

The camera module 2280 may capture still images and moving pictures. The camera module 2280 may include a lens assembly including one or more lenses, image sensors, image signal processors, and/or flashes. The lens assembly included in the camera module 2280 may collect light emitted from an object which is an image capturing target, and include one of the meta-optical devices 100, 101, 102, 103, 104 and 105 according to the above-described embodiments.

The power management module 2288 may manage power supplied to the electronic device 2201. The power management module 2288 may be implemented as part of a Power Management Integrated Circuit (PMIC).

The battery 2289 may supply power to the components of the electronic device 2201. The battery 2289 may include a non-rechargeable primary battery, a rechargeable secondary battery and/or a fuel cell.

The communication module 2290 may establish a direct (wired) communication channel and/a wireless communication channel between the electronic device 2201 and another electronic device (e.g., the electronic device 2202, an electronic device 2204, the server 2208 or the like), and support communication through the established communication channel. The communication module 2290 may include one or more processors that are operated independently of the processor 2220 (e.g., an application processor, etc.) and support direct communication and/or wireless communication. The communication module 2290 may include a wireless communication module 2292 (e.g., a cellular communication module, a short-range wireless communication module, a Global Navigation Satellite System (GMSS) communication module, etc.) and/or a wired communication module 2294 (e.g., a Local Area Network (LAN) communication module, a power line communication module, etc.). Among these communication modules, a corresponding communication module may communicate with another electronic device through the first network 2298 (e.g., a short-range communication network such as Bluetooth, Wi-Fi Direct, or Infrared Data Association (IrDA)) or the second network 2299 (e.g., a long-distance communication network such as a cellular network, the Internet, or a computer network (e.g., LAN, WAN, etc.)). Such various types of communication modules may be integrated into one component (e.g., a single chip or the like) or implemented as a plurality of separate components (e.g., a plurality of chips). The wireless communication module 2292 may identify and authenticate the electronic device 2201 in a communication network such as the first network 2298 and/or the second network 2299, based on subscriber information (e.g., an International Mobile subscriber identifier (IMSI), etc.) stored in the subscriber identification module 2296.

The antenna module 2297 may transmit a signal and/or power to or receive a signal and/or power from the outside (e.g., another electronic device, or the like). The antenna module 2297 may include a radiator including a conductive pattern on a substrate (e.g., a printed circuit board (PCB), or the like). The antenna module 2297 may include one or more antennas. When a plurality of antennas are included in the antenna module 2297, an antenna appropriate for a communication method employed in a communication network such as the first network 2298 and/or the second network 2299 may be selected by the communication module 2290 from among the plurality of antennas. A signal and/or power may be transmitted or received between the communication module 2290 and another electronic device via the selected antenna. In addition to the antenna, other components (e.g., a radio-frequency integrated circuit (RFIC), etc.) may be provided as part of the antenna module 2297.

Some of the components may be connected to one another and exchange signals (e.g., commands, data, etc.) with one another by a communication method (e.g., a bus, a General-Purpose Input and Output (GPIO), a Serial Peripheral Interface (SPI), or a Mobile Industry Processor Interface (MIPI)).

Command or data may be transmitted or received between the electronic device 2201 and the electronic device 2204, which is an external device, through the server 2208 connected to the second network 2299. Other electronic devices 2202 and 2204 may be device of the same type as or a different type from the electronic device 2201. All or some of operations to be performed by the electronic device 2201 may be performed by at least one among the other electronic devices 2202, 2204, and 2208. For example, when a function or service is to be performed by the electronic device 2201, one or more other electronic devices may be requested to perform the entire or part of the function or service instead of performing the function or service by the electronic device 2201. One or more other electronic devices receiving the request may perform an additional function or service associated with the request and transmit a result of performing the additional function to the electronic device 2201. To this end, cloud computing, distributed computing, and/or client-server computing technology may be used.

Figure 17:
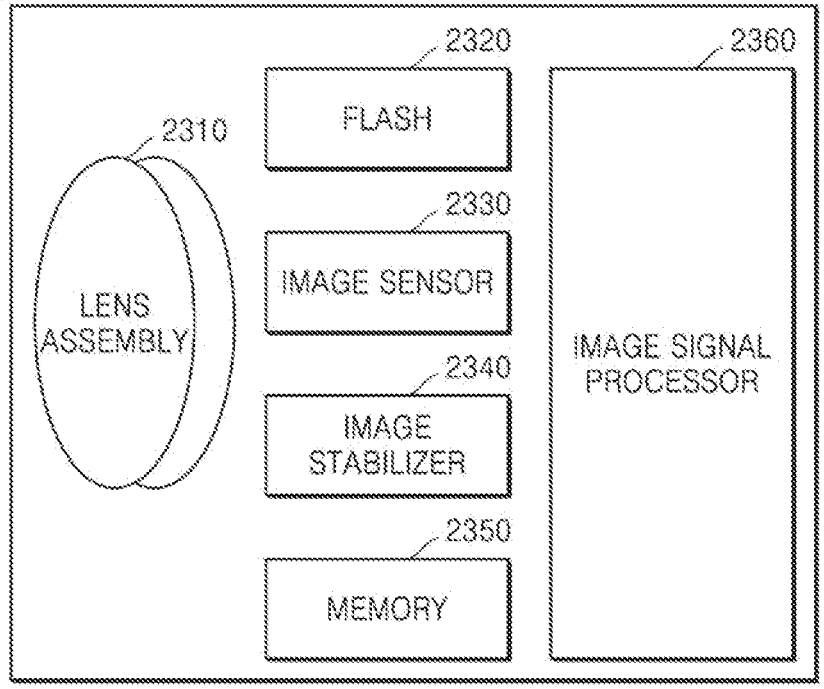
FIG. 17 is a schematic block diagram of a camera module included in the electronic device of FIG. 16.

FIG. 17 is a schematic block diagram of the camera module 2280 included in the electronic device 2201 of FIG. 16.

Referring to FIG. 17, the camera module 2280 may include a lens assembly 2310, a flash 2320, an image sensor 2330, an image stabilizer 2340, a memory 2350 (a buffer memory, etc.), and/or an image signal processor 2360. The lens assembly 2310 may collect light emitted from an object, which is an image capturing target, and include one of the above-described meta-optical devices 100, 101, 102, 103, 104 and 105. The lens assembly 2310 may include one or more refractive lenses and a meta-optical device. The meta-optical device may be designed as a lens with a target phase delay profile exhibiting constant condensing efficiency with respect to a wide wavelength band. The lens assembly 2310 including the meta-optical device may have desired optical performance and may have a short optical length.

The camera module 2280 may further include an actuator. The actuator may drive lens elements of the lens assembly 2310 to be moved and adjust a distance between the lens elements, for example, for zooming and/or autofocusing (AF).

The camera module 2280 may include a plurality of lens assemblies 2310 and may function as a dual camera, a 360-degree camera, or a spherical camera in this case. Some of the plurality of lens assemblies 2310 may have the same lens attributes (e.g., an angle of view, a focal length, an auto focus, an F-number, an optical zoom, etc.) or different lens attributes. The lens assembly 2310 may include a wide-angle lens or telephoto lens.

The flash 2320 may emit light to be used to enhance light emitted or reflected from an object. The flash 2320 may include one or more light-emitting diodes (LEDs) (a red-green-blue (RGB) LED, and a Xenon lamp. The image sensor 2330 may convert light, which is emitted or reflected from an object and transmitted through the lens assembly 2310, into an electrical signal to obtain an image corresponding to the object. The image sensor 2330 may include one or more sensors selected from among image sensors having different attributes, e.g., an RGB sensor, a black-and-white (BW) sensor, an infrared (IR) sensor, and an ultraviolet (UV) sensor. Each sensor included in the image sensor 2330 may be implemented as a Charge-Coupled Device (CCD) sensor and/or a Complementary Metal Oxide Semiconductor (CMOS) sensor.

The image stabilizer 2340 may move one or more lenses included in the lens assembly 2310 or the image sensor 2330 in a certain direction or control operating characteristics (e.g., readout timing, etc.) of the image sensor 2330 in response to a movement of the camera module 2280 or the electronic device 2201 including the camera module 2280, thereby compensating for an negative influence due to the movement. The image stabilizer 2340 may detect a movement of the camera module 2280 or the electronic device 2201 by using a gyro sensor (not shown) or an acceleration sensor (not shown) provided inside or outside the camera module 2280. The image stabilizer 2340 may be implemented in an optical manner The memory 2350 may store some or all of images obtained through the image sensor 2330 for a next image processing operation. For example, when a plurality of images are obtained at high speeds, obtained source data (e.g., Bayer-patterned data, high-resolution data, etc.) may be stored in the memory 2350 and only low-resolution images may be displayed and used to transmit source data of a selected image (e.g., which is selected by a user, or the like) to the image signal processor 2360. The memory 2350 may be integrated into the memory 2230 of the electronic device 2201 or embodied as a separate memory operated independently.

The image signal processor 2360 may perform one or more image processing operations on an image obtained by the image sensor 2330 or image data stored in the memory 2350. The one or more image processing operations may include generating a depth map, 3D modeling, generating panoramic images, extracting feature points, synthesizing images, and/or image compensation (e.g., noise reduction, resolution adjustment, brightness adjustment, blurring, sharpening, softening, etc.). The image signal processor 2360 may perform control (e.g., exposure time control, or readout timing control, etc.) with regard to components (e.g., the image sensor 2330, etc.) of the camera module 2280. An image processed by the image signal processor 2360 may be stored in the memory 2350 to be additionally processed or may be provided to external components (e.g., the memory 2230, the display device 2260, the electronic device 2202, the electronic device 2204, the server 2208, etc.) of the camera module 2280. The image signal processor 2360 may be integrated into the processor 2220 or embodied as a separate processor operated independently of the processor 2220. When the image signal processor 2360 is embodied as a processor independent of the processor 2220, an image processed by the image signal processor 2360 may be additionally image-processed by the processor 2220 and displayed on the display device 2260.

The electronic device 2201 may include a plurality of camera modules 2280 having different attributes or functions. In this case, one of the plurality of camera modules 2280 may be a wide-angle camera and another may be a telephoto camera. Similarly, one of the plurality of cameras modules 2280 may be a front camera and another may be a rear camera.

Figure 18:
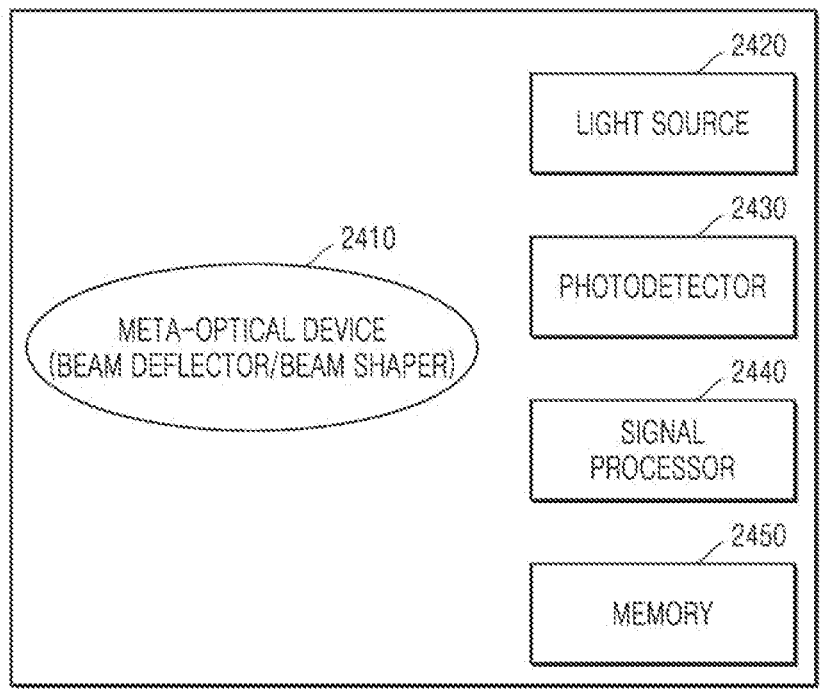
FIG. 18 is a schematic block diagram of a three-dimensional (3D) sensor provided in the electronic device of FIG. 16.

FIG. 18 is a schematic block diagram of the 3D sensor 2214 provided in the electronic device 2201 of FIG. 16.

The 3D sensor 2214 emits light to an object and receives and analyzes light reflected from the object to sense a shape, movement, etc., of the object. The 3D sensor 2214 includes a light source 2420, a meta-optical device 2410, a photodetector 2430, a signal processor 2440, and a memory 2450. One of the meta-optical devices 100, 101, 102, 103, 104 and 105 according to the above-described embodiments may be employed as the meta-optical device 2410, and a target phase delay profile may be set to allow the meta-optical device 2410 as a beam deflector or a beam shaper.

The light source 2420 emits light to be used to analyze the shape and position of the object. The light source 2420 may include a light source for generating and emitting light of a certain wavelength. The light source 2420 may include a light source, such as a laser diode (LD), an LED, or a super luminescent diode, which generates and emits light of a wavelength band appropriate for analyzing a position and shape of an object. The light source 2420 may be a wavelength-variable laser diode. The light source 2420 may generate and emit light of a plurality of different wavelength bands. The light source 2420 may generate and emit pulse light or continuous light.

The meta-optical device 2410 modulates light emitted from the light source 2420 and transmits the modulated light to an object. When the meta-optical device 2410 is a beam deflector, the meta-optical device 2410 may deflect incident light in a certain direction toward the object. When the meta-optical device 2410 is a beam shaper, the meta-optical device 2410 modulates incident light such that the incident light has a distribution of a certain pattern. The meta-optical device 2410 may form a structured light suitable for a 3D shape analysis.

As described above, the meta-optical device 2410 may exhibit constant diffraction efficiency with respect to a wavelength of a broadband. Therefore, beam steering may be performed with improved accuracy or a desired beam pattern having no deviation with respect to a wavelength.

The photodetector 2430 receives reflected light of light passing through the meta-optical device 2410 and emitted to the object. The photodetector 2430 may include an array of a plurality of sensors for sensing light or may include only one sensor.

The signal processor 2440 may process a signal sensed by the photodetector 2430 to analyze the shape, etc. of the object. The signal processor 2440 may analyze a 3D shape including a depth position of the object.

To analyze the 3D shape, an operation for measuring a time-of-flight of light may be performed. Various operation methods may be used to measure the time-of-flight of the light. For example, in a direct time measurement method, a distance to an object is measured by emitting pulse light to the object and measuring a time incurred to receive light reflected and returned from the object. In a correlation method, pulse light is emitted to an object and a distance to the object is measured, based on the brightness of light reflected and returned from the object. In a phase delay measurement method, light of a continuous wave such as a sine wave is emitted to an object, and a phase difference between the light and reflected light reflected and returned from the object is detected and converted into a distance.

When structural light is emitted to an object, a depth position of the object may be calculated from a change of a pattern of the structured light reflected from the object, i.e., according to a result of comparing the pattern of the structured light with a pattern of a reflected structured light. Depth information of the object may be extracted by tracking a change of the pattern of the reflected structured light, which is reflected from the object, at various coordinates, and 3D information related to the shape and movement of the object may be extracted from the depth information.

The memory 2450 may store programs and other data for an operation of the signal processor 2440.

A result of the operation of the signal processor 2440, i.e., information regarding the shape and position of the object, may be transmitted to another unit included in the electronic device 2201 or to another electronic device. For example, the information may be used by the application 2246 stored in the memory 2230. The other electronic device to which the result of the operation is transmitted may be a display device or a printer that outputs the result. Alternatively, the other electronic device may be, but is not limited to, an autonomous driving device such as an unmanned automobile, an autonomous vehicle, a robot, or a drone, a smart phone, a smart watch, a cellular phone, a PDA, a laptop PC, various types of wearable devices, other mobile or non-mobile computing devices, or an IoT device.

The meta-optical device and an electronic device including the same have been described above with reference to the embodiments illustrated in the drawings but are only examples, and it will be apparent to those of ordinary skill in the art that various modifications may be made and other equivalent embodiments are derivable. Therefore, the embodiments set forth herein should be considered in a descriptive sense only and not for purposes of limitation. The scope of the present disclosure is set forth in the claims rather than in the foregoing description, and all differences falling within a scope equivalent thereto should be construed as being included in the present disclosure.

The meta-optical device uses nanostructures arranged in a plurality of layers, i.e., three or more layers, and a change of a refractive index and a change of a dispersion of each layer may be adjusted to achieve a desired phase delay profile with respect to light of a desired wavelength band.

The meta-optical device may exhibit high diffraction efficiency with respect to light of a wide wavelength band.

The meta-optical device may be used as a lens, a beam deflector, a beam shaper, etc., and is applicable to various types of electronic devices using the same.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A meta-optical device which exhibits a target phase delay profile with respect to incident light in a predetermined wavelength band, the meta-optical device comprising:
a first layer including a plurality of first nanostructures and a first surrounding material surrounding the plurality of first nanostructures, the first layer having a first phase delay profile of a first tendency that is substantially equal to a tendency of the target phase delay profile;
a second layer provided adjacent to the first layer and including a plurality of second nanostructures and a second surrounding material surrounding the plurality of second nanostructures, the second layer having a second phase delay profile of a second tendency that is substantially opposite to the tendency of the target phase delay profile; and
a third layer provided adjacent to the second layer and including a plurality of third nanostructures and a third surrounding material surrounding the plurality of third nanostructures, the third layer having a third phase delay profile different from the second phase delay profile, wherein the third layer includes a third material that is different than a second material of the second layer, or includes a third arrangement rule that is different than a second arrangement rule of the second layer.

2. The meta-optical device of claim 1, wherein the predetermined wavelength band comprises a visible-light band or a near-infrared band.

3. The meta-optical device of claim 1, wherein the predetermined wavelength band has a bandwidth greater than or equal to substantially 300 nanometers.

4. The meta-optical device of claim 1, wherein a minimum diffraction efficiency in the predetermined wavelength band is greater than or equal to substantially 90%.

5. The meta-optical device of claim 1, wherein a ratio $\Delta\lambda/\lambda_0$ of a bandwidth $\Delta\lambda$ to a center wavelength $\lambda_0$ of the predetermined wavelength band is greater than or equal to substantially 15%.

6. The meta-optical device of claim 1, wherein the plurality of first nanostructures, the plurality of second nanostructures, and the plurality of third nanostructures each have shape dimensions less than a center wavelength of the predetermined wavelength band.

7. The meta-optical device of claim 1, wherein a height of the plurality of first nanostructures with respect to a center wavelength $\lambda_0$ of the predetermined wavelength band is in a range of substantially $2\lambda_0$ to $5\lambda_0$.

8. The meta-optical device of claim 7, wherein a ratio of the height of the plurality of first nanostructures to a width of the plurality of first nanostructures is greater than substantially 2.

9. The meta-optical device of claim 1, wherein respective heights of the plurality of second nanostructures and the plurality of third nanostructures with respect to a center wavelength $\lambda_0$ of the predetermined wavelength band are in a range of substantially $0.5\lambda_0$ to $2\lambda_0$.

10. The meta-optical device of claim 1, wherein the first layer comprises a plurality of phase modulation regions in which a certain range of phase modulation is repeatedly performed, and wherein a section of the first layer adjacent to a boundary between the plurality of phase modulation regions is not provided with the plurality of first nanostructures.

11. The meta-optical device of claim 10, wherein a ratio of a width of the section to a width of a corresponding phase modulation region is greater than or equal to substantially 5%.

12. The meta-optical device of claim 1, wherein the third material of the third layer has a lower refractive index and a lower dispersion than the second material of the second layer.

13. The meta-optical device of claim 12, wherein:
the plurality of first nanostructures has a lower refractive index than a refractive index of the first surrounding material,
the plurality of second nanostructures has a higher refractive index than a refractive index of the second surrounding material, and
the plurality of first nanostructures and the plurality of second nanostructures each have a substantially similar tendency of change of a width in a direction away from a center of the meta-optical device.

14. The meta-optical device of claim 13, wherein the plurality of third nanostructures has a refractive index greater than a refractive index of the third surrounding material and less than the refractive index of the plurality of second nanostructures.

15. The meta-optical device of claim 13, further comprising a substrate having a refractive index less than or equal to the refractive index of the third surrounding material,
wherein the third layer, the second layer, and the first layer are sequentially arranged on the substrate.

16. The meta-optical device of claim 13, wherein the plurality of third nanostructures has a refractive index less than a refractive index of the third surrounding material, and the third surrounding material has a refractive index less than the refractive index of the plurality of second nanostructures.

17. The meta-optical device of claim 16, further comprising a substrate having a refractive index less than or equal to the refractive index of the third surrounding material,
wherein the third layer, the first layer, and the second layer are sequentially arranged on the substrate.

18. The meta-optical device of claim 12, wherein
the plurality of first nanostructures has a refractive index less than the refractive index of the first surrounding material,
the plurality of second nanostructures has a refractive index less than the refractive index of the second surrounding material, and
the plurality of first nanostructures and the plurality of second nanostructures have substantially opposite tendencies of change of a width in a direction away from a center of the meta-optical device.

19. The meta-optical device of claim 18, wherein the plurality of third nanostructures has a refractive index greater than a refractive index of the third surrounding material and less than a refractive index of the second surrounding material.

20. The meta-optical device of claim 19, further comprising a substrate having a refractive index less than or equal to a refractive index of the third surrounding material,
wherein the third layer, the second layer, and the first layer are sequentially arranged on the substrate.

21. The meta-optical device of claim 12, wherein:
the plurality of first nanostructures has a refractive index greater than a refractive index of the first surrounding material,
the plurality of second nanostructures has a refractive index greater than a refractive index of the second surrounding material, and
the plurality of first nanostructures and the plurality of second nanostructures have substantially opposite tendencies of change of a width in the direction away from the center of the meta-optical device.

22. The meta-optical device of claim 21, wherein the plurality of third nanostructures has a refractive index greater than a refractive index of the third surrounding material and less than the refractive index of the plurality of second nanostructures.

23. The meta-optical device of claim 21, wherein the plurality of third nanostructures has a refractive index less than a refractive index of the third surrounding material and the refractive index of the plurality of second nanostructures.

24. The meta-optical device of claim 1, wherein the plurality of first nanostructures, the plurality of second nanostructures, and the plurality of third nanostructures each have a cylindrical shape, a polyprism shape, a truncated cone shape, or a truncated polygonal shape.

25. The meta-optical device of claim 1, wherein a cross section of each of the plurality of first nanostructures, the plurality of second nanostructures, and the plurality of third nanostructures perpendicular to respective heights of the plurality of first nanostructures, the plurality of second nanostructures, and the plurality of third nanostructures has a circular shape, a polygonal shape, a circular ring shape, or a polygonal ring shape.

26. The meta-optical device of claim 1, wherein a refractive index difference at each of the first layer, the second layer, and the third layer is greater than or equal to substantially 0.2.

27. An electronic device comprising:
a meta-optical device which exhibits a target phase delay profile with respect to incident light in a predetermined wavelength band, the meta-optical device comprising:
a first layer including a plurality of first nanostructures and a first surrounding material surrounding the plurality of first nanostructures, the first layer having a first phase delay profile of a first tendency that is substantially equal to a tendency of the target phase delay profile;
a second layer provided adjacent to the first layer and including a plurality of second nanostructures and a second surrounding material surrounding the plurality of second nanostructures, the second layer having a second phase delay profile of a second tendency that is substantially opposite to the tendency of the target phase delay profile; and
a third layer provided adjacent to the second layer and including a plurality of third nanostructures and a third surrounding material surrounding the plurality of third nanostructures, the third layer having a third phase delay profile different from the second phase delay profile, wherein the third layer includes a third material that is different than a second material of the second layer, or includes a third arrangement rule that is different than a second arrangement rule of the second layer.

28. A meta-optical device comprising:
a first layer including a plurality of first nanostructures and a first surrounding material surrounding the plurality of first nanostructures, the plurality of first nanostructures having a first refractive index that is less than a second refractive index of the first surrounding material;
a second layer provided adjacent to the first layer and including a plurality of second nanostructures and a second surrounding material surrounding the plurality of second nanostructures, the plurality of second nanostructures having a third refractive index that is greater than a fourth refractive index of the second surrounding material; and
a third layer provided adjacent to the second layer and including a plurality of third nanostructures and a third surrounding material surrounding the plurality of third nanostructures, the plurality of third nanostructures having a fifth refractive index that is greater than a sixth refractive index of the third surrounding material and less than the third refractive index of the plurality of second nanostructures.

* * * * *